United States Patent
Naito

(10) Patent No.: US 10,096,814 B2
(45) Date of Patent: Oct. 9, 2018

(54) BATTERY PACK

(71) Applicant: MAKITA CORPORATION, Anjo-shi, Aichi (JP)

(72) Inventor: Akira Naito, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 211 days.

(21) Appl. No.: 15/179,384

(22) Filed: Jun. 10, 2016

(65) Prior Publication Data

US 2017/0012272 A1    Jan. 12, 2017

(30) Foreign Application Priority Data

Jul. 6, 2015  (JP) ................................ 2015-135168

(51) Int. Cl.
| | |
|---|---|
| *H01M 2/30* | (2006.01) |
| *H01M 10/62* | (2014.01) |
| *H01M 10/6235* | (2014.01) |
| *H01M 2/10* | (2006.01) |
| *H01M 10/0525* | (2010.01) |
| *H01R 4/48* | (2006.01) |
| *H01R 33/76* | (2006.01) |

(52) U.S. Cl.
CPC ........... *H01M 2/30* (2013.01); *H01M 2/1022* (2013.01); *H01M 10/0525* (2013.01); *H01M 10/6235* (2015.04); *H01R 4/4809* (2013.01); *H01R 33/765* (2013.01); *H01M 2/1055* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2001/0000945 A1 | 5/2001 | Watson et al. | |
| 2005/0068132 A1* | 3/2005 | Marquardt | ............... H01F 5/04 335/202 |

(Continued)

FOREIGN PATENT DOCUMENTS

| | | | |
|---|---|---|---|
| EP | 2 597 701 A1 | 5/2013 | |
| EP | 2 602 880 A1 | 6/2013 | |

(Continued)

OTHER PUBLICATIONS

Oct. 17, 2016 European Search Report issued in European Patent Application No. 16175962.6.

*Primary Examiner* — Scott J. Chmielecki
(74) *Attorney, Agent, or Firm* — Oliff PLC

(57) ABSTRACT

The present description discloses a battery pack capable of being detachably attached to an apparatus including an apparatus terminal having a flat plate-like shape by sliding the battery pack in a sliding direction along the apparatus terminal. The battery pack includes a battery terminal capable of engaging with the apparatus terminal so as to be electrically connected therewith. The battery terminal includes a pair of elastic clamping pieces configured to receive the apparatus terminal when the battery pack is attached to the apparatus and to clamp the apparatus terminal from both sides of the apparatus terminal. In the battery pack, the pair of the elastic clamping pieces extends in a direction perpendicular to the sliding direction.

12 Claims, 20 Drawing Sheets

(56) References Cited

U.S. PATENT DOCUMENTS

| 2008/0061738 A1* | 3/2008 | Hanawa | B25F 5/00 |
| | | | 320/112 |
| 2013/0136956 A1* | 5/2013 | Nakano | H01M 2/105 |
| | | | 429/7 |
| 2013/0244504 A1 | 9/2013 | Ogura | |

FOREIGN PATENT DOCUMENTS

| EP | 2 639 891 A2 | 9/2013 |
| JP | 2013-191288 A | 9/2013 |
| JP | 2013-196817 A | 9/2013 |

* cited by examiner

BATTERY PACK

CROSS-REFERENCE TO RELATED APPLICATION

This application claims priority to Japanese Patent Application No. 2015-135168 filed on Jul. 6, 2015, the entire contents of which are hereby incorporated by reference into the present application.

TECHNICAL FIELD

The technique disclosed herein relates to a battery pack.

DESCRIPTION OF RELATED ART

Japanese Patent Application Publication No. 2013-191288 discloses a battery pack that can be detachably attached to an apparatus provided with a flat plate-like apparatus terminal by sliding in a sliding direction along the apparatus terminal. The battery pack is provided with a battery terminal that is to be engaged with the apparatus terminal and is electrically connected thereto. The battery terminal is provided with a pair of elastic clamping pieces that is to receive the apparatus terminal when the battery pack is attached to the apparatus, and that is configured to retain the apparatus terminal from its both sides. In the battery pack, the pair of elastic clamping pieces extends in the sliding direction.

SUMMARY

In order to suppress mechanical wear and electrical wear of the apparatus terminal as well as the battery terminal, it is preferable to enlarge a contact area between the apparatus terminal and the battery terminal. However, in a configuration as in the above battery pack in which each of the pair of elastic clamping pieces extends in the sliding direction, in order to enlarge the contact area between the apparatus terminal and the battery terminal, a width in a direction perpendicular to the sliding direction of the pair of elastic clamping pieces needs to be widened. Normally, there is not much space left within a battery pack regarding a direction perpendicular to the sliding direction. Due to this, if the width in the direction perpendicular to the sliding direction of the pair of elastic clamping pieces is further widened, the battery pack as a whole would become larger. A technique that is capable of enlarging the contact area between the apparatus terminal and the battery terminal without giving a cause to a size increase in the battery pack is desired.

The present description discloses a battery pack comprises a battery terminal capable of engaging with an apparatus terminal having a flat plate-like shape so as to be electrically connected with the apparatus terminal. The battery pack is capable of being detachably attached to an apparatus including the apparatus terminal by sliding the battery pack in a sliding direction along the apparatus terminal. The battery terminal comprises a pair of elastic clamping pieces configured to receive the apparatus terminal when the battery pack is attached to the apparatus and to clamp the apparatus terminal from both sides of the apparatus terminal. In the battery pack, the pair of the elastic clamping pieces extends in a direction perpendicular to the sliding direction.

In the above battery pack, each clamping piece in the pair of elastic clamping pieces extends in the direction perpendicular to the sliding direction. Thus, in the above battery pack, a contact area between the apparatus terminal and the battery terminal can be increased by widening a width of the pair of elastic clamping pieces in the sliding direction. Generally in most cases, an extra space is provided regarding the sliding direction within the battery pack. Thus, even if the width of the pair of elastic clamping pieces in the sliding direction is widened, a size of the battery pack will not be increased thereby. According to the above battery pack, the contact area between the apparatus terminal and the battery terminal can be increased without enlarging the size of the battery pack.

DETAILED DESCRIPTION

Figure 1:
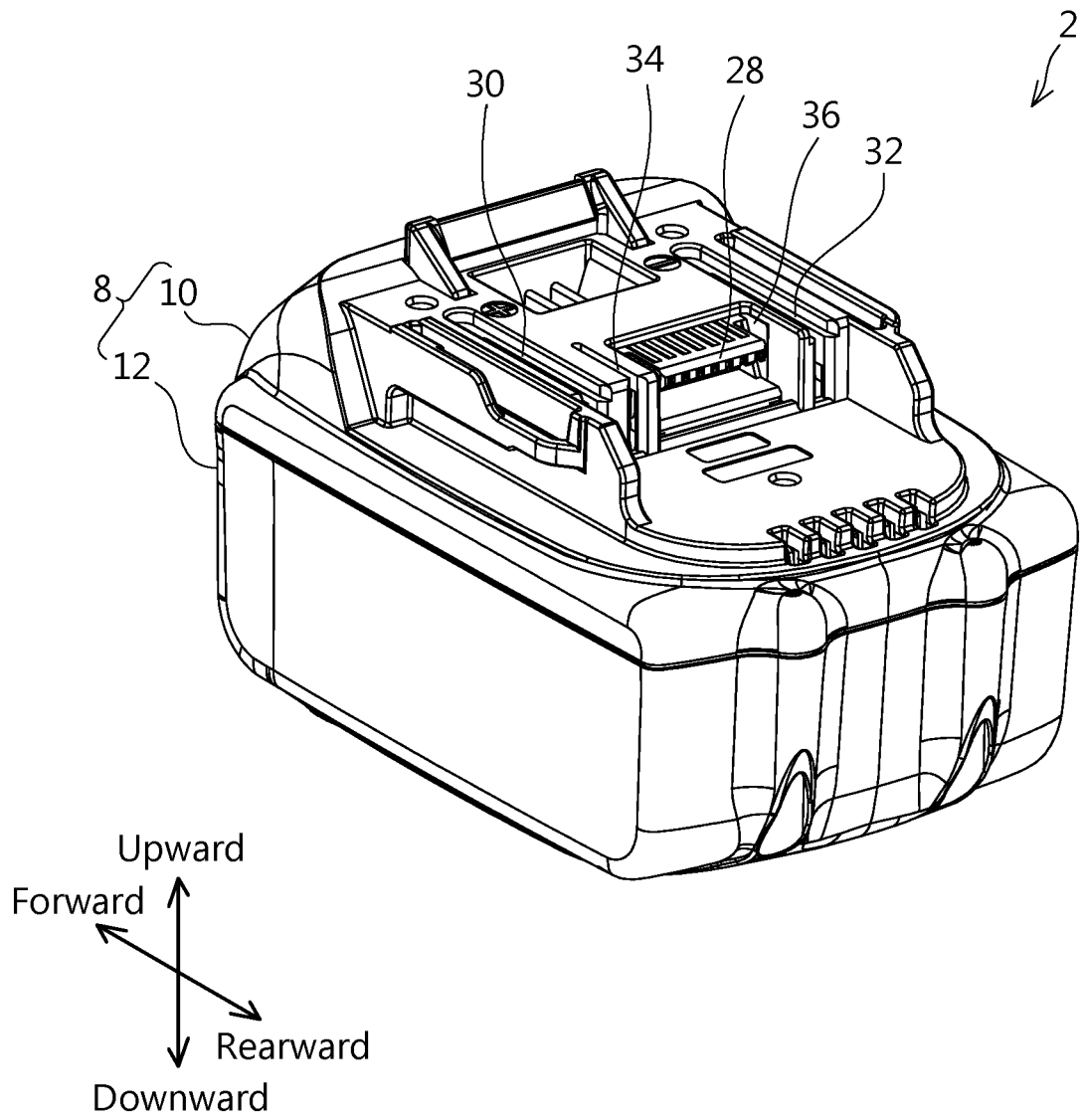
FIG. 1 is a perspective view of a battery pack 2 of an embodiment as seen from a rear upper side.

Battery packs according to some embodiments each have an insertion guide at each end of the pair of the elastic clamping pieces. Where the ends are provided on a side for receiving the apparatus terminal along the sliding direction. The insertion guides may be insertion guide ribs extending from the corresponding ends of the pair of the elastic clamping pieces. Alternatively, the insertion guides may be insertion guide recesses formed by notching the corresponding ends of the pair of the elastic clamping pieces.

According to the above battery pack, the apparatus terminal can smoothly be inserted into the pair of elastic clamping pieces upon attaching the battery pack to the apparatus.

Battery packs according to some embodiments may each have a withdrawal guide at each end of the pair of the elastic clamping pieces, where the ends are provided on an opposite side of a side for receiving the apparatus terminal along the sliding direction. The withdrawal guides may be withdrawal guiding ribs that extend from the aforementioned ends of the pair of elastic clamping pieces.

According to the above battery pack, the apparatus terminal can smoothly be taken out from the pair of elastic clamping pieces upon detaching the battery pack from the apparatus.

In battery packs according to some embodiments, the pair of the elastic clamping pieces may comprise a plurality of pairs of the elastic clamping pieces divided by one or more slits.

According to the above battery pack, since the apparatus terminal and the battery terminal come to have a multipoint contact, an electric connection failure therebetween that may be caused by vibration or deformation can be suppressed. Further, in the above battery pack, upon attaching or detaching the battery pack to or from the apparatus, dust that may be present between the apparatus terminal and the pairs of elastic clamping pieces can be discharged from the slit(s) upon insertion and withdrawal of the apparatus terminal. By configuring as above, an electric connection failure that may be caused by the dust that is present between the apparatus terminal and the pairs of elastic clamping pieces can be suppressed.

In the above battery pack, each of the plurality of pairs of the elastic clamping pieces comprises first-side ends and second-side ends along the sliding direction, the first-side ends being located on a side for receiving the apparatus terminal along the sliding direction, and the second-side ends being located on an opposite side of the side for receiving the apparatus terminal along the sliding direction. The plurality of pairs of the elastic clamping pieces may comprise: at least one pair of elastic clamping pieces that comprises withdrawal guide ribs on the second-side ends; an adjacent pair of elastic clamping pieces that comprises insertion guide recesses on the first-side ends and that is adjacent to the second-side ends of the at least one pair of elastic clamping pieces; and a first pair of elastic clamping pieces that comprises insertion guide ribs on the first-side ends and that is the first pair to receive the apparatus terminal among the plurality of the pairs when the battery pack is attached to the apparatus. The withdrawal guide ribs extend from the second-side ends of the at least one pair of elastic clamping pieces. The insertion guide recesses are formed by notching the first-side ends of the adjacent pair of the elastic clamping pieces. The insertion guide ribs extend from the first-side ends of the first pair of the elastic clamping pieces.

According to the above battery pack, the apparatus terminal can smoothly be inserted into the pair of elastic clamping pieces upon attaching the battery pack to the apparatus. Further, according to the above battery pack, the apparatus terminal can smoothly be taken out from the pair of elastic clamping pieces upon detaching the battery pack from the apparatus. Moreover, according to the above battery pack, since the insertion guiding recesses are provided corresponding to the withdrawal guiding ribs, the withdrawal guiding ribs are prevented from interfering with the adjacent pair of elastic clamping pieces. According to the above battery pack, the combination of the withdrawal guiding ribs and the insertion guiding recesses enables smooth insertion and withdrawal of the apparatus terminal without increasing the size of the battery pack, while at the same time ensuring the wide contact area between the apparatus terminal and the battery terminal.

Embodiments

Figure 2:
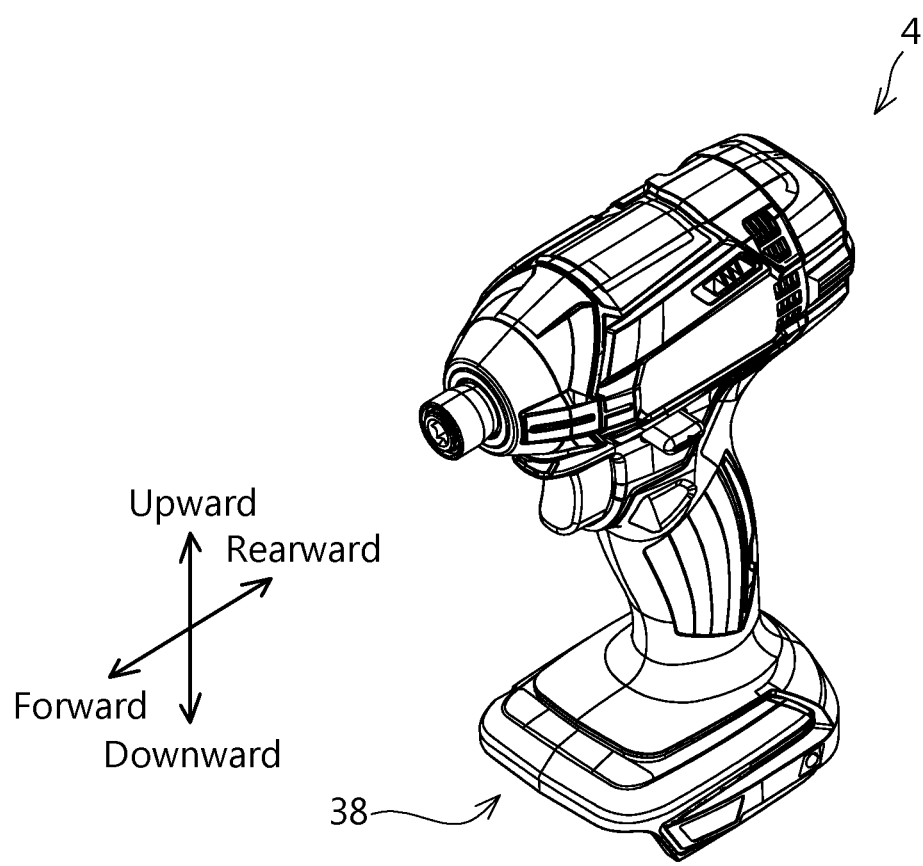
FIG. 2 is a perspective view of a power tool 4 to which the battery pack 2 is to be attached in the embodiment as seen from a front upper side.
Figure 3:
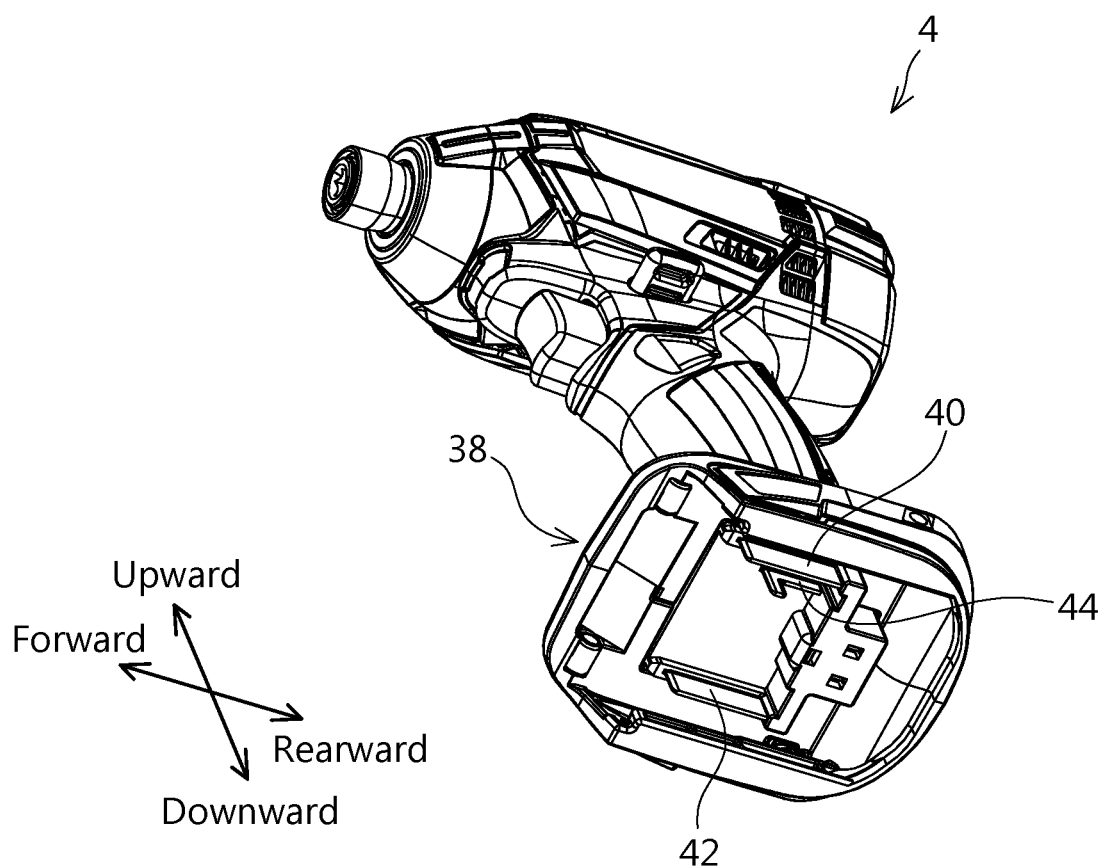
FIG. 3 is a perspective view of the power tool 4 to which the battery pack 2 is to be attached in the embodiment as seen from a front lower side.

Hereinbelow, embodiments of a battery pack 2 will be described with reference to the drawings. A battery pack 2 shown in FIG. 1 can be detachably attached to a power tool 4 (see FIGS. 2 and 3). In FIGS. 2 and 3, an example in which the power tool 4 is a power driver is shown, however, the power tool 4 may for example be a power drill, a power grinder, a power circular saw, a power chainsaw, a power reciprocal saw, a power mower, a power trimmer, or a power blower. When attached to the power tool 4, the battery pack 2 supplies electric power to the power tool 4. Further, the battery pack 2 can be detachably attached to a charger (not shown). When attached to the charger, the battery pack 2 is supplied with electric power from the charger. Notably, in the description below, a direction in which the power tool 4 or the charger is located as seen from the battery pack 2 when the battery pack 2 is attached to the power tool 4 or the charger is denoted as an upward direction, and its opposite a downward direction. Further, a direction toward which the battery pack 2 is slid upon attaching it to the power tool 4 or the charger is denoted as a rearward direction, and a direction toward which the battery pack 2 is slid upon detaching the battery pack 2 from the power tool 4 or the charger is denoted as a forward direction. That is, in the description below, a front and rear direction corresponds to a sliding direction along which the battery pack 2 is slid relative to the power tool 4 or the charger.

The battery pack 2 comprises a battery module 6 (see FIG. 4), and an outer casing 8 (see FIG. 1) for housing the battery module 6. The outer casing 8 has a substantially rectangular box shape as its overall shape, and is divided into an upper casing 10 and a lower casing 12. The upper casing 10 and the lower casing 12 are fixed to each other by a fixture such as a bolt.

Figure 4:
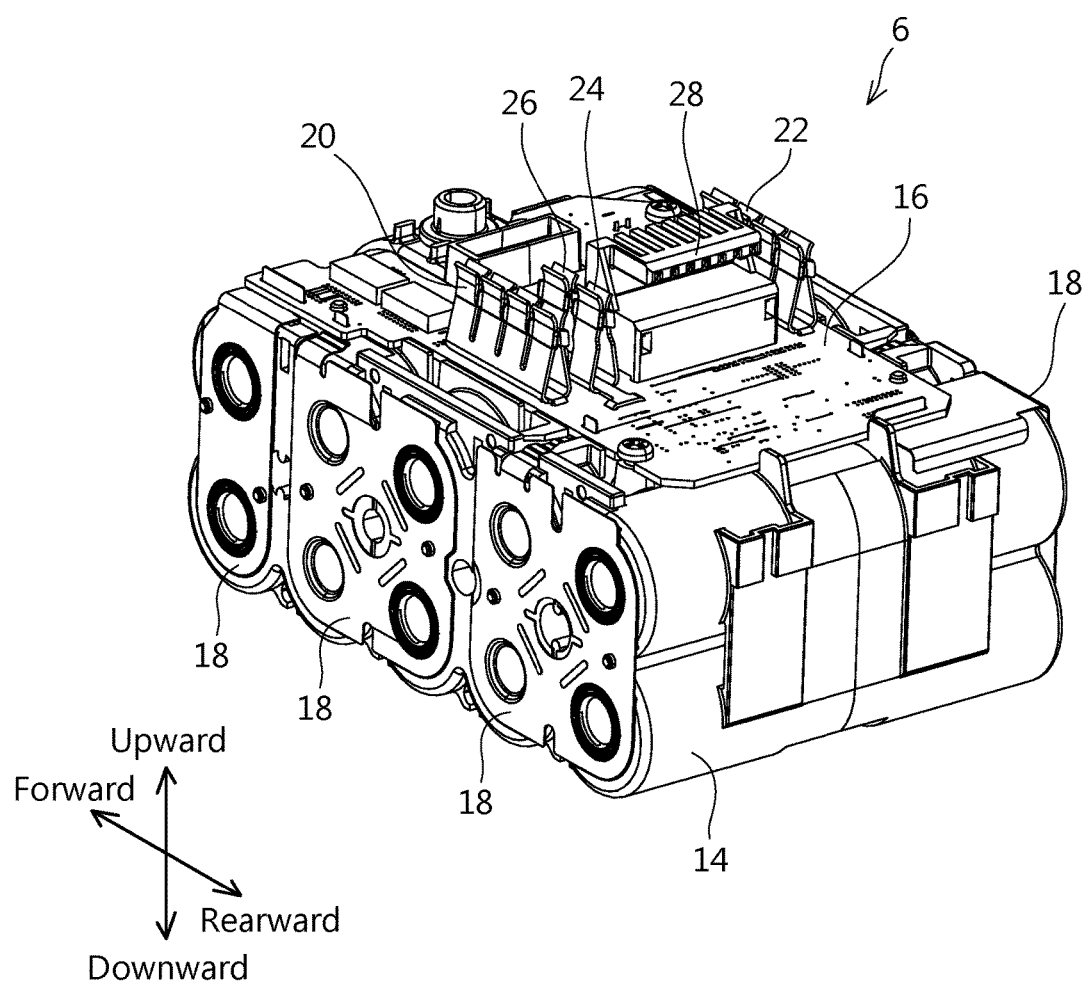
FIG. 4 is a perspective view of a battery module 6 of the embodiment as seen from the rear upper side.

As shown in FIG. 4, the battery module 6 comprises a cell casing 14 for housing a plurality of battery cells (not shown), and a controller board 16. In the present embodiment, each of the battery cells is a cylindrical secondary battery cell, such as a lithium ion battery cell, in which a positive terminal is provided at one end and a negative terminal is provided at the other end. Respective ones of the battery cells are arranged in the up and down direction as well as in the front and rear direction so that an orientation from the positive terminal toward the negative terminal is arranged in the same direction between the battery cells that are adjacent in the up and down direction and that an orientation from the positive terminal toward the negative terminal is arranged in the opposite direction between the battery cells that are adjacent in the front and rear direction. The positive and negative terminals of each of the battery cells are exposed to the outside of the cell casing 14, and are connected to metal connecting plates 18 provided on right and left sides of the cell casing 14. The battery cells that are adjacent in the up and down direction are electrically connected in parallel by the connecting plates 18. Further, the battery cells that are adjacent in the front and rear direction are electrically connected serially by the connecting plates 18. Notably, as a different embodiment from the above, the battery module 6 may comprise laminate type secondary battery cells.

The controller board 16 is arranged above the cell casing 14. The controller board 16 is arranged along a surface that is perpendicular to the up and down direction. The controller board 16 is fixed to the cell casing 14 for example by a fixture such as bolts.

A positive discharging terminal 20, a negative charging/discharging terminal 22, a positive charging terminal 24, a discharge-prohibiting signal terminal 26, and a charge-control signal terminal 28 are provided on an upper surface of the controller board 16. The positive discharging terminal 20 is used as a positive terminal for supplying power from the battery pack 2 to the power tool 4 when the battery pack 2 is attached to the power tool 4. The negative charging/discharging terminal 22 is used as a negative terminal for supplying power from the battery pack 2 to the power tool 4 when the battery pack 2 is attached to the power tool 4, and it is also used as a negative terminal for supplying power from the charger to the battery pack 2 when the battery pack 2 is attached to the charger. The positive charging terminal 24 is used as a positive terminal for supplying power from the charger to the battery pack 2 when the battery pack 2 is attached to the charger. The discharge-prohibiting signal terminal 26 is used for sending a discharge-prohibiting signal from the battery pack 2 to the power tool 4 when the battery pack 2 is attached to the power tool 4. The charge-control signal terminal 28 is used for sending a charge-control signal from the battery pack 2 to the charger when the battery pack 2 is attached to the charger.

The positive discharging terminal 20 is arranged within a first opening 30 provided in an upper surface of the upper casing 10 shown in FIG. 1. The negative charging/discharging terminal 22 is arranged within a second opening 32 provided in the upper surface of the upper casing 10. The positive charging terminal 24 and the discharge-prohibiting signal terminal 26 are provided side by side in the front and rear direction within a third opening 34 provided in the upper surface of the upper casing 10. The charge-control signal terminal 28 is exposed to the outside from a fourth opening 36 provided in the upper surface of the upper casing 10.

As shown in FIGS. 2 and 3, the power tool 4 comprises a battery attaching unit 38 to which the battery pack 2 is to be attached. As shown in FIG. 3, the battery attaching unit 38 of the power tool 4 is provided with a rectangular flat plate-like positive terminal 40 arranged along the front and rear direction and the up and down direction, a rectangular flat plate-like negative terminal 42 arranged along the front and rear direction and the up and down direction, and an L-shaped flat plate-like signal terminal 44 arranged along the front and rear direction and the up and down direction. The signal terminal 44 includes a long portion of which longitudinal direction extends along the front and rear direction, and a short portion extending from the long portion and having its longitudinal direction extending along the up and down direction. Notably, in a state where the power tool 4 is finished as a product, the long portion of the signal terminal 44 is covered by resin, and only the short portion of the signal terminal 44 is exposed. The positive terminal 40 and the negative terminal 42 have corners at their front-side edges chamfered. The short portion of the signal terminal 44 is chamfered respectively at its corners on its front-side and back-side edges.

Upon attaching the battery pack 2 to the power tool 4, the positive terminal 40, the negative terminal 42, and the signal terminal 44 of the power tool 4 enter respectively into the first opening 30, the second opening 32, and the third opening 34 of the battery pack 2 by sliding the battery pack 2 rearward relative to the power tool 4, as a result of which the aforementioned terminals of the power tool 4 are respectively engaged with the positive discharging terminal 20, the negative charging/discharging terminal 22, and the discharge-prohibiting signal terminal 26, and are electrically conducted. Upon detaching the battery pack 2 from the power tool 4, the positive terminal 40, the negative terminal 42, and the signal terminal 44 of the power tool 4 are released from their engagements with the positive discharging terminal 20, the negative charging/discharging terminal 22, and the discharge-prohibiting signal terminal 26 by sliding the battery pack 2 forward relative to the power tool 4, as a result of which the aforementioned terminals of the power tool 4 are taken out from the first opening 30, the second opening 32, and the third opening 34 of the battery pack 2.

Similarly, although not shown, the charger is likewise provided with a battery attaching unit to which the battery pack 2 is to be attached. The battery attaching unit of the charger is provided with a rectangular flat plate-like negative terminal arranged along the front and rear direction and the up and down direction, a rectangular flat plate-like positive terminal arranged along the front and rear direction and the up and down direction, and a signal terminal.

Upon attaching the battery pack 2 to the charger, the negative terminal and the positive terminal of the charger enter respectively into the second opening 32 and the third opening 34 by sliding the battery pack 2 rearward relative to the charger, as a result of which the aforementioned terminals of the charger are respectively engaged with the negative charging/discharging terminal 22 and the positive charging terminal 24 and are electrically conducted, and further the signal terminal of the charger engages with the charge-control signal terminal 28 of the battery pack 2. Upon detaching the battery pack 2 from the charger, the negative terminal and the positive terminal of the charger are released from their engagements with the negative charging/discharging terminal 22 and the positive charging terminal 24 by sliding the battery pack 2 forward, as a result of which the aforementioned terminals of the charger are taken out from the second opening 32 and the third opening 34, and the signal terminal of the charger is released from its engagement with the charge-control signal terminal 28.

In the battery pack 2 of the present embodiment, the positive discharging terminal 20 and the negative charging/discharging terminal 22 are terminals having the same shape. Hereinbelow, the positive discharging terminal 20 will be described in detail as an example, and the detailed description for the negative charging/discharging terminal 22 will be omitted. Further, in the battery pack 2 of the present embodiment, the positive charging terminal 24 and the discharge-prohibiting signal terminal 26 are terminals having the same shape. Hereinbelow, the discharge-prohibiting signal terminal 26 will be described in detail as an example, and the detailed description for the positive charging terminal 24 will be omitted.

Figure 5:
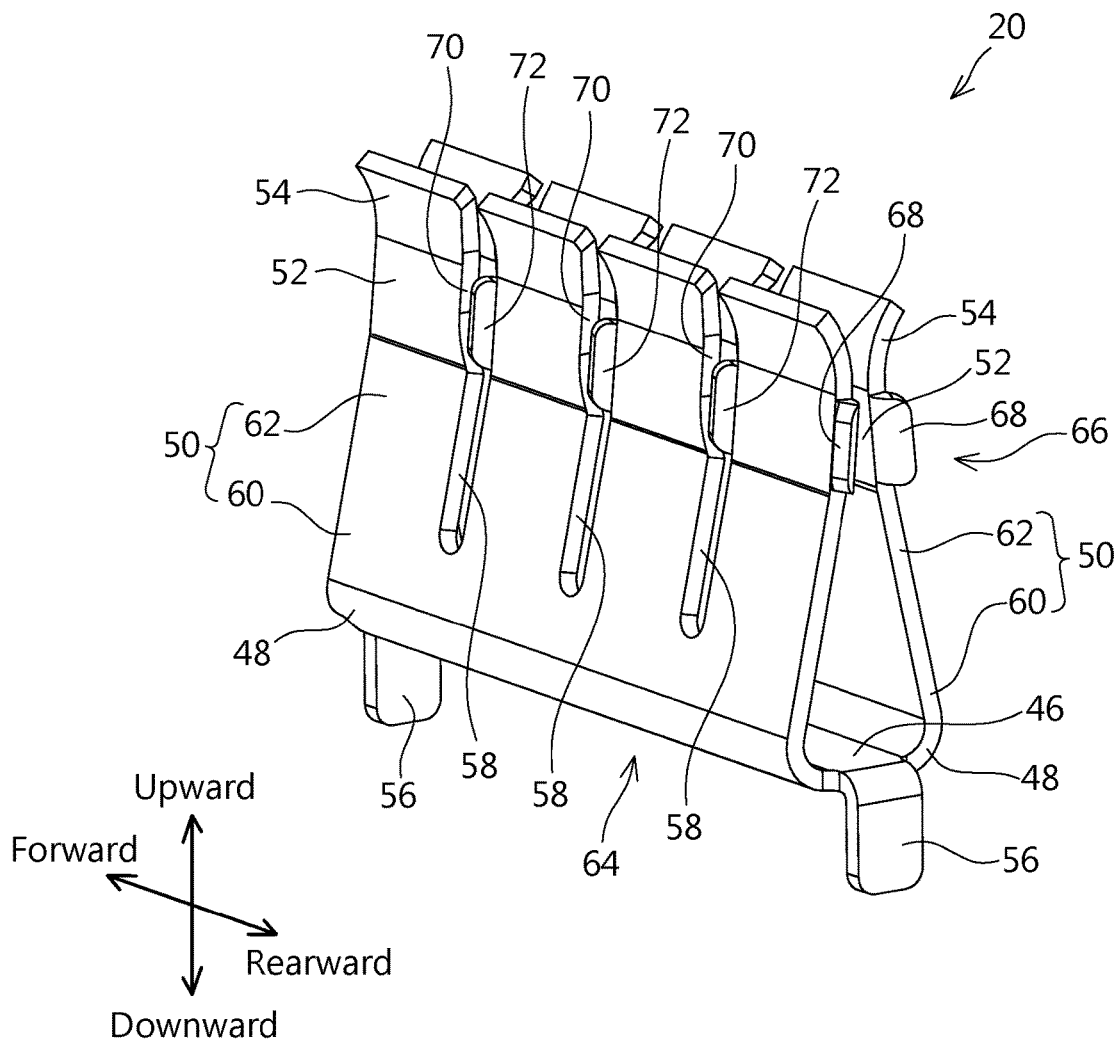
FIG. 5 is a perspective view of a positive discharging terminal 20 of the embodiment as seen from the rear upper side.
Figure 6:
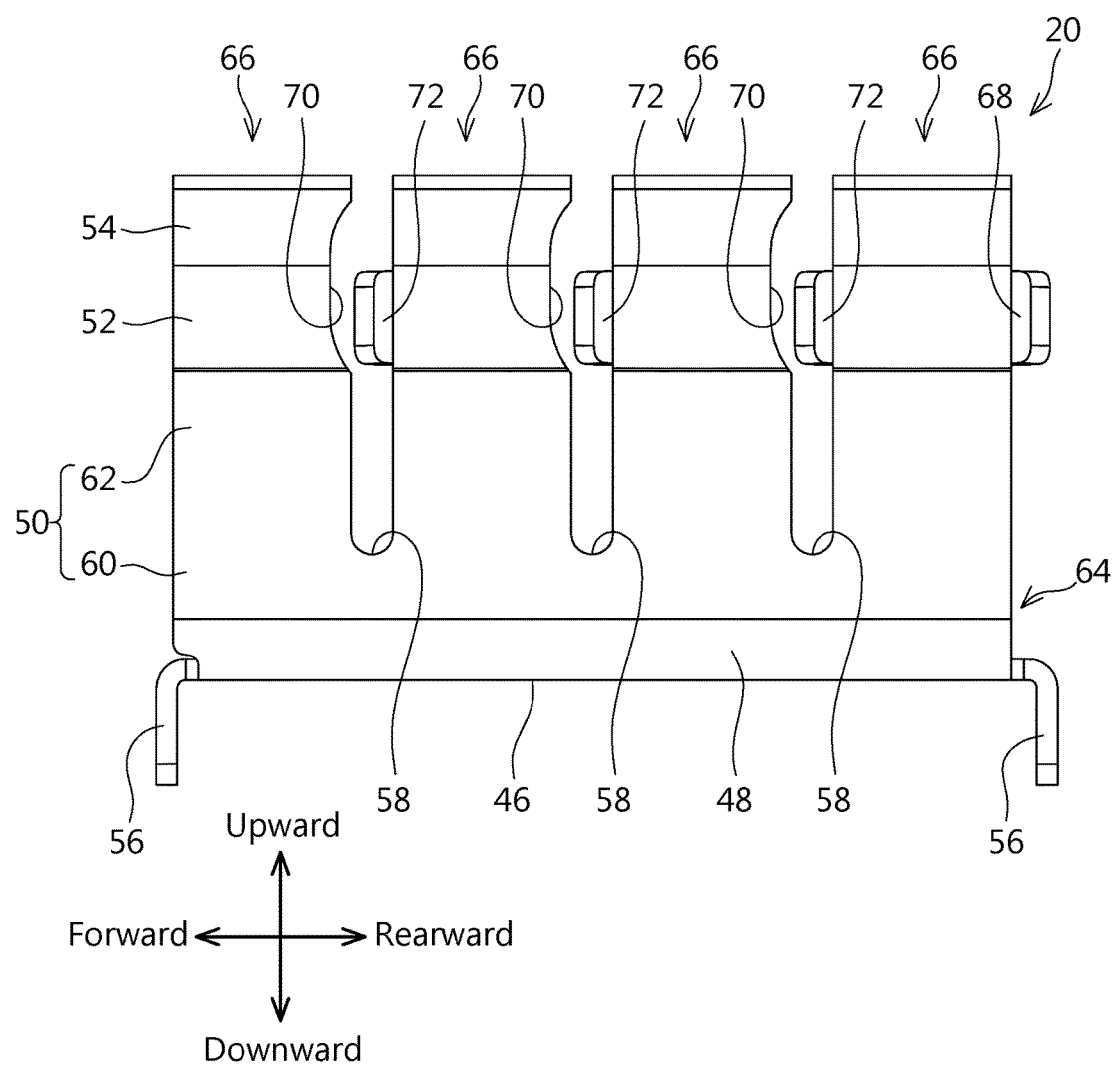
FIG. 6 is a side view of the positive discharging terminal 20 of the embodiment.
Figure 7:
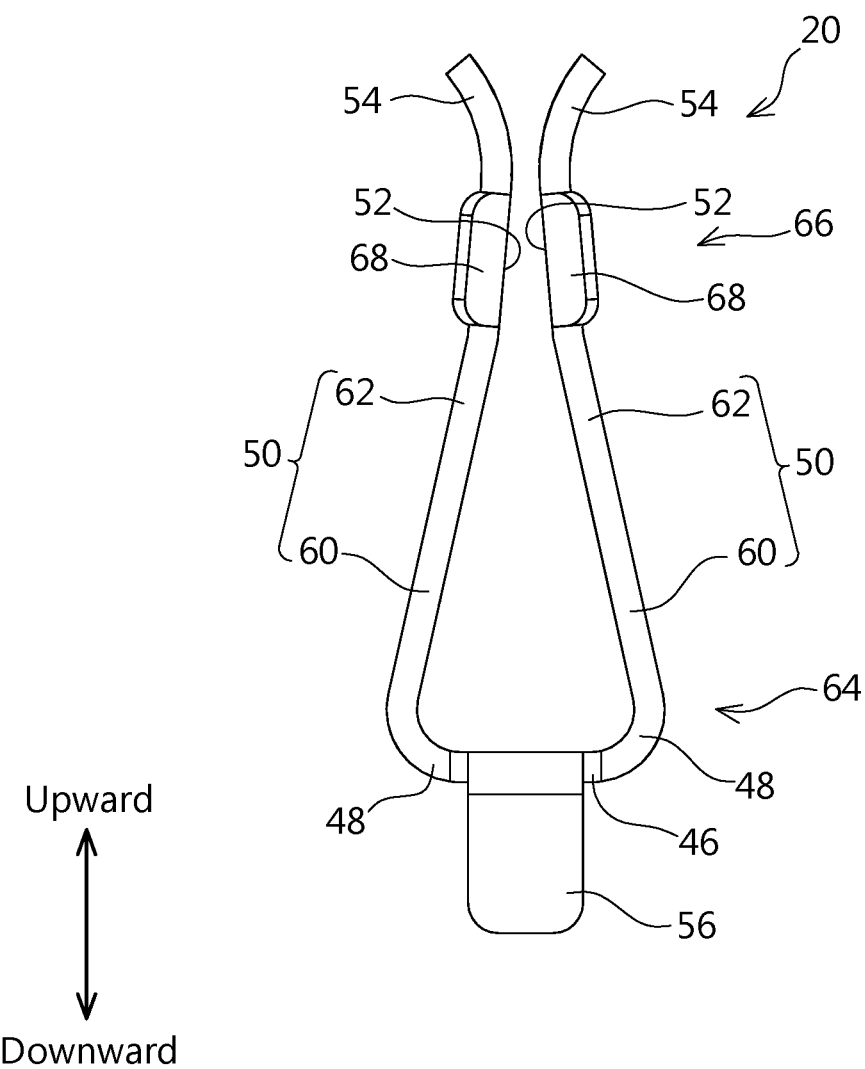
FIG. 7 is a rear view of the positive discharging terminal 20 of the embodiment.

The positive discharging terminal 20 shown in FIGS. 5, 6, and 7 is produced by cutting and bending a metal plate. The positive discharging terminal 20 comprises a bottom plate portion 46, lower curved portions 48, inclined portions 50, clamping portions 52, and upper curved portions 54. The bottom plate portion 46 has a rectangular shape of which longitudinal direction extends along the front and rear direction of the battery pack 2. A fixing rib 56 for fixing the positive discharging terminal 20 onto the controller board 16 (see FIG. 3) is provided at each of front and rear ends of the bottom plate portion 46. The fixing ribs 56 have a shape that is bent downward from corresponding one of the front and rear ends of the bottom plate portion 46.

The lower curved portions 48 are provided on both sides of the bottom plate portion 46 in a left and right direction. The lower curved portions 48 have a shape that curves upward from both side ends of the bottom plate portion 46. The inclined portions 50 have a flat plate-like shape extending from upper ends of the lower curved portions 48. As shown in FIGS. 5 and 7, the inclined portions 50 are inclined relative to the bottom plate portion 46 so that an angle formed between each inclined portion 50 and the bottom plate portion 46 becomes an acute angle. The clamping portions 52 have a flat plate-like shape that extends from upper ends of the inclined portions 50 and are slightly bent outward. The clamping portions 52 have their inclination angle adjusted so that the inclination angle becomes an angle parallel to surfaces of the positive terminal 40 when the positive terminal 40 of the power tool 4 is engaged with the positive discharging terminal 20, that is, so that it becomes an angle that enables a surface contact with the positive terminal 40. The upper curved portions 54 have a shape that is curved outward from upper ends of the clamping portions 52.

The positive discharging terminal 20 is provided with a plurality of slits 58. Each slit 58 has a U-shape that extends from the upper ends of its corresponding upper curved portions 54 and reaches a midst of its corresponding inclined portion 50. Hereinbelow, the inclined portions 50 on a lower side than lower ends of the slits 58 may be termed lower-side inclined portions 60, and the inclined portions 50 on an upper side than the lower ends of the slits 58 may be termed upper-side inclined portions 62. Further, the bottom plate portion 46, the lower curved portions 48, and the lower-side inclined portions 60 may collectively be termed a base 64 of the positive discharging terminal 20. Further, the upper-side inclined portions 62, the clamping portions 52, and the upper curved portions 54 that are divided by the plurality of slits 58 may collectively be termed pairs of elastic clamping pieces 66 of the positive discharging terminal 20. That is, the positive discharging terminal 20 comprises the base 64, and a plurality of pairs of elastic clamping pieces 66 extending upward from the base 64.

Figure 8:
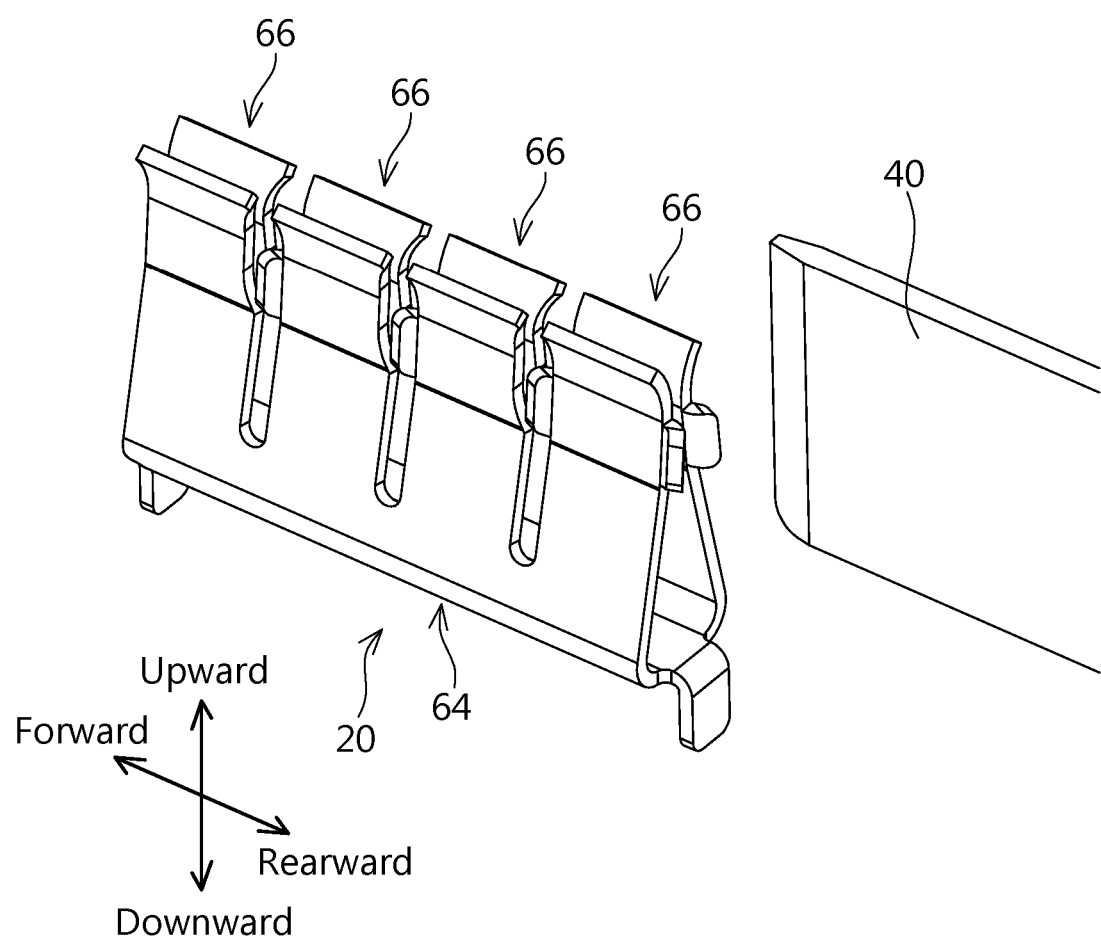
FIG. 8 is a perspective view of how a positive terminal 40 is inserted into the positive discharging terminal 20 in the embodiment.
Figure 9:
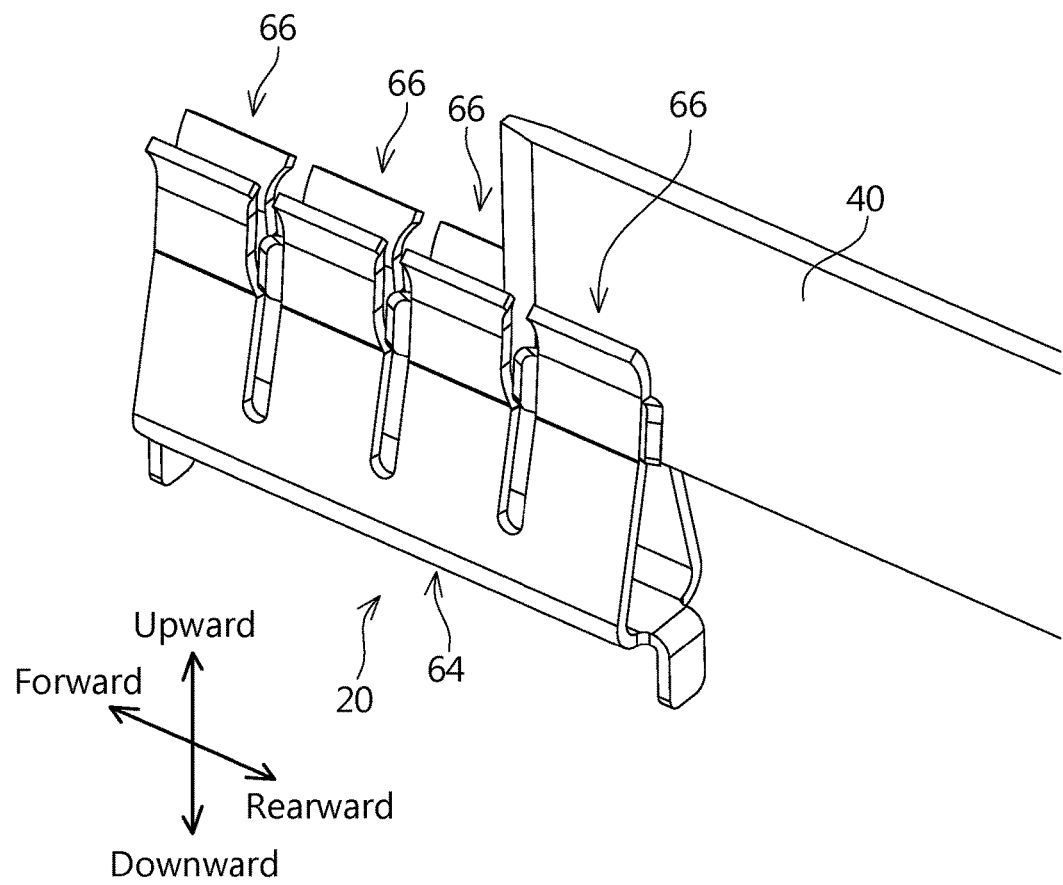
FIG. 9 is a perspective view of how the positive terminal 40 is inserted into the positive discharging terminal 20 in the embodiment.
Figure 10:
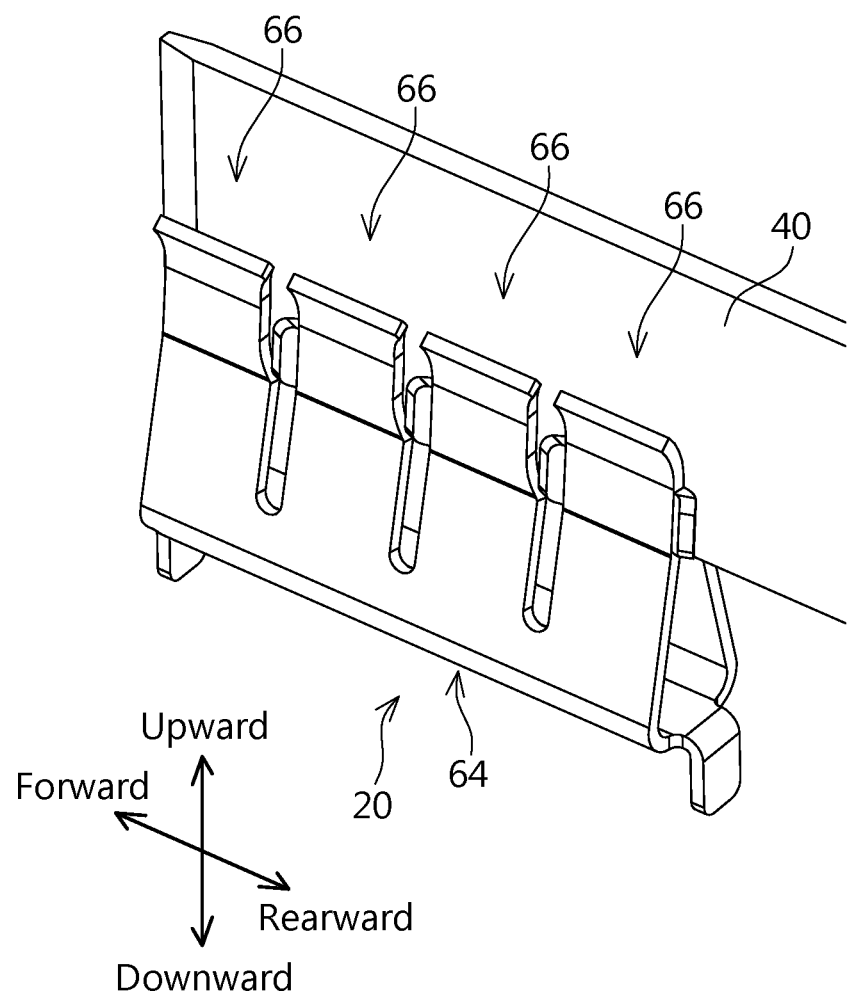
FIG. 10 is a perspective view of how the positive terminal 40 is inserted into the positive discharging terminal 20 in the embodiment.

As shown in FIGS. 8 to 10, in the case where the positive terminal 40 of the power tool 4 is inserted into the positive discharging terminal 20, a forward edge of the positive terminal 40 enters between the pairs of elastic clamping pieces 66 of the positive discharging terminal 20, by which the pairs of elastic clamping pieces 66 are opened outward, and the positive terminal 40 is clamped by the pairs of elastic clamping pieces 66. At this occasion, the positive discharging terminal 20 and the positive terminal 40 are engaged by the clamping portions 52 of the positive discharging terminal 20 being pressed against the positive terminal 40 by resilient returning force of the pairs of elastic clamping pieces 66. That is, when the battery pack 2 is attached to the power tool 4, the pairs of elastic clamping pieces 66 receive the positive terminal 40 of the power tool 4 and clamp the positive terminal 40 from both sides. Contrary to this, when the positive terminal 40 of the power tool 4 is taken out from the positive discharging terminal 20, the engagement of the positive discharging terminal 20 and the positive terminal 40 is released. Then, the pairs of elastic clamping pieces 66 return to their original shape by the resilient returning force of the pairs of elastic clamping pieces 66.

As shown in FIGS. 5 to 7, in the positive discharging terminal 20 of the present embodiment, the inclined portions 50 are provided under the clamping portions 52, and the upper curved portions 54 are provided above the clamping portions 52. Due to this, upon when the positive terminal 40 engages with the positive discharging terminal 20, the corners at the edges of the positive discharging terminal 20 in the up and down direction (that is, cut surfaces where the metal plate has been cut) do not make a point contact with the surfaces of the positive terminal 40, and the clamping portions 52 and the surfaces of the positive terminal 40 can be brought into surface contact. By configuring as such, the positive terminal 40 can be inserted and taken out smoothly.

In the present embodiment, insertion guiding ribs 68 are provided on rearward ends of the pair of elastic clamping pieces 66 that is arranged at the rearmost side of the positive discharging terminal 20, that is, the pair of elastic clamping pieces 66 that receives the positive terminal 40 of the power tool 4 first upon attaching the battery pack 2 to the power tool 4. The insertion guiding ribs 68 have a shape that extends rearward from the rearward ends of the clamping portions 52, and curves outward. When the insertion guiding ribs 68 are provided, the forward edge of the positive terminal 40 makes contact with inner surfaces of the insertion guiding ribs 68 upon when the positive terminal 40 is inserted, and the pair of elastic clamping pieces 66 is thereby spread outward. By configuring as above, the forward edge of the positive terminal 40 is allowed to enter easily in between the pair of elastic clamping pieces 66. Further, upon when the positive terminal 40 is inserted into the positive discharging terminal. 20, the corners of the rearward edge of the positive discharging terminal 20 (that is, cut surfaces where the metal plate has been cut) do not make a point contact with the surfaces of the positive terminal 40. Thus, by providing the insertion guiding ribs 68, the insertion of the positive terminal 40 can be performed smoothly.

In the present embodiment, insertion guiding recesses 70 are provided at rearward ends of the pairs of elastic clamping pieces 66 other than the pair of elastic clamping pieces 66 provided at the rearmost side of the positive discharging terminal 20. As shown in FIG. 6, the insertion guiding recesses 70 are formed by cutting out the upper-side inclined portions 62, the clamping portions 52, and the upper curved portions 54 in a substantially arc shape from the rearward edges of the pairs of elastic clamping pieces 66. When the insertion guiding recesses 70 are provided, a space for the forward edge of the positive terminal 40 of the power tool 4 to enter between the pairs of elastic clamping pieces 66 is widened, and the forward edge of the positive terminal 40 is more easily inserted between the pairs of elastic clamping pieces 66. Further, upon when the positive terminal 40 is inserted into the positive discharging terminal 20, the corners of the rearward edge of the positive discharging terminal 20 (that is, the cut surfaces where the metal plate has been cut) do not make a point contact with the surfaces of the positive terminal 40. Thus, by providing the insertion guiding recesses 70, the insertion of the positive terminal 40 can be performed smoothly.

In the present embodiment, withdrawal guiding ribs 72 are provided at forward ends of the pairs of elastic clamping pieces 66 other than the pair of elastic clamping pieces 66 provided at the forwardmost side of the positive discharging terminal 20. The withdrawal guiding ribs 72 have a shape that extends forward from the forward ends of the clamping portions 52 and curves outward. When the withdrawal guiding ribs 72 are provided, upon when the positive terminal 40 is taken out from the positive discharging terminal 20, the corners of the forward edge of the positive discharging terminal 20 (that is, cut surfaces where the metal plate has been cut) do not make a point contact with the surfaces of the positive terminal 40. Further, when the withdrawal guiding ribs 72 are provided, the positive terminal 40 can easily be taken out even in cases where a surface roughness caused by mechanical wear or electrical wear is generated on the surfaces of the positive terminal 40 of the power tool 4. Thus, by providing the withdrawal guiding ribs 72, the withdrawal of the positive terminal 40 can be performed smoothly.

In the present embodiment, each of the plurality of pairs of elastic clamping pieces 66 of the positive discharging terminal 20 comprises the clamping portions 52. Due to this, the positive discharging terminal 20 and the positive terminal 40 can be engaged by multiple contact points. By configuring as above, an electric connection failure between the positive discharging terminal 20 and the positive terminal 40 that may be caused by vibration or deformation can be suppressed.

In the present embodiment, the positive discharging terminal 20 comprises the plurality of slits 58. Due to this, dust that may be present between the positive terminal 40 and the positive discharging terminal 20 can be discharged from the slits 58 upon the insertion and the withdrawal of the positive terminal 40. By configuring as above, an electric connection failure that may be caused by the dust adhered to surfaces of the positive discharging terminal 20 or on surfaces of the positive terminal 40 can be suppressed.

In the present embodiment, the pairs of elastic clamping pieces 66 of the positive discharging terminal 20 extend along the up and down direction. In this case, a contact area between the positive discharging terminal 20 and the positive terminal 40 can be made large by widening a width of the pairs of elastic clamping pieces 66 in the front and rear direction. The contact area between the positive discharging terminal 20 and the positive terminal 40 can be made large without increasing a size of the battery pack 2. Further, in the configuration in which the pairs of elastic clamping pieces 66 of the positive discharging terminal 20 extend along the up and down direction, an arm length of the pairs of elastic clamping pieces 66 (that is, a length from each connecting point with the base 64 to the corresponding clamping portion 52) can be made sufficiently long. Due to this, clamping force by the pairs of elastic clamping pieces 66 that is exerted upon when the positive discharging terminal 20 is engaged with the positive terminal 40 can be increased.

Figure 11:
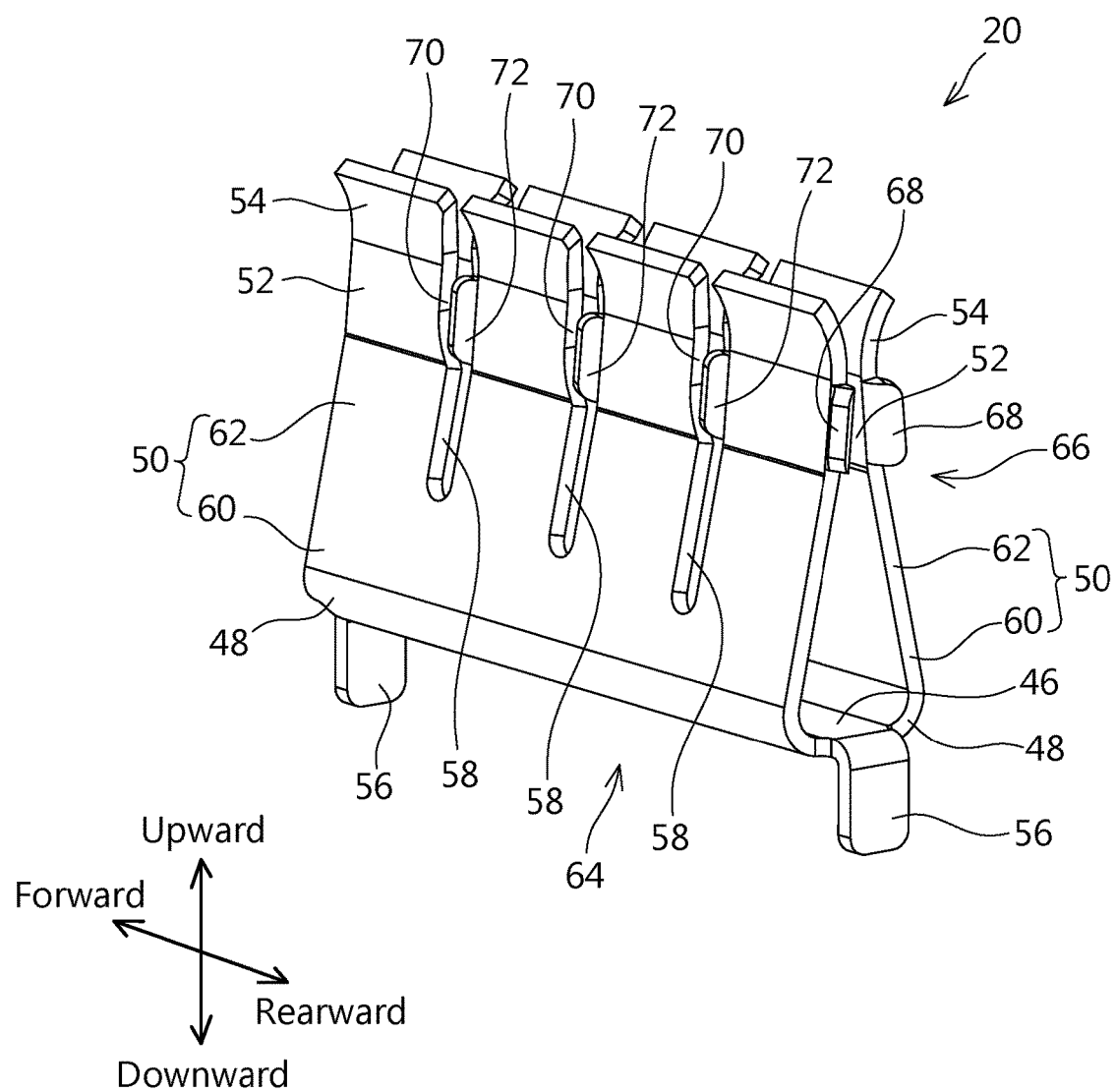
FIG. 11 is a perspective view of a positive discharging terminal 20 of a variant as seen from e rear upper side.
Figure 12:
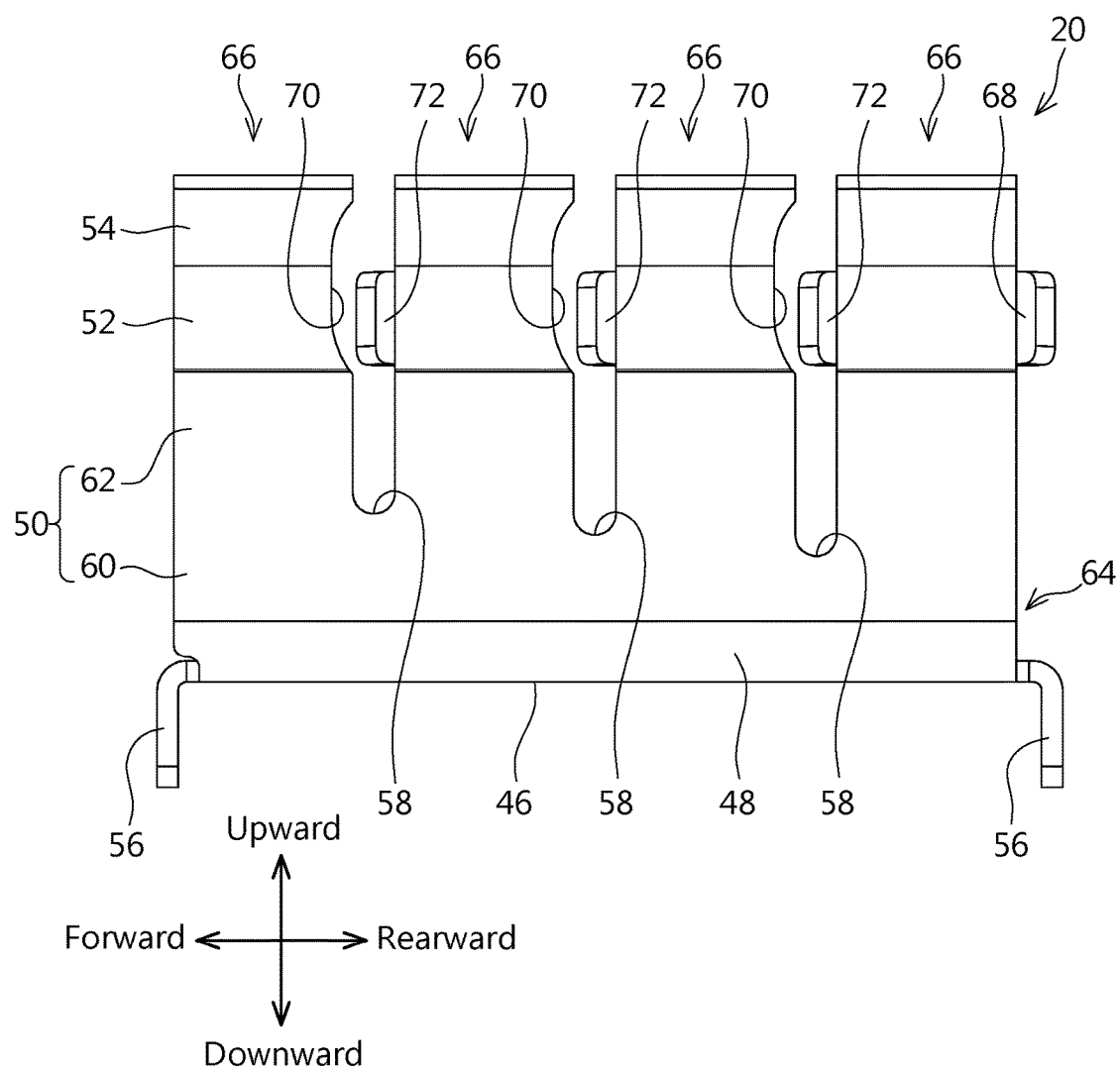
FIG. 12 is a side view of the positive discharging terminal 20 of the variant.
Figure 13:
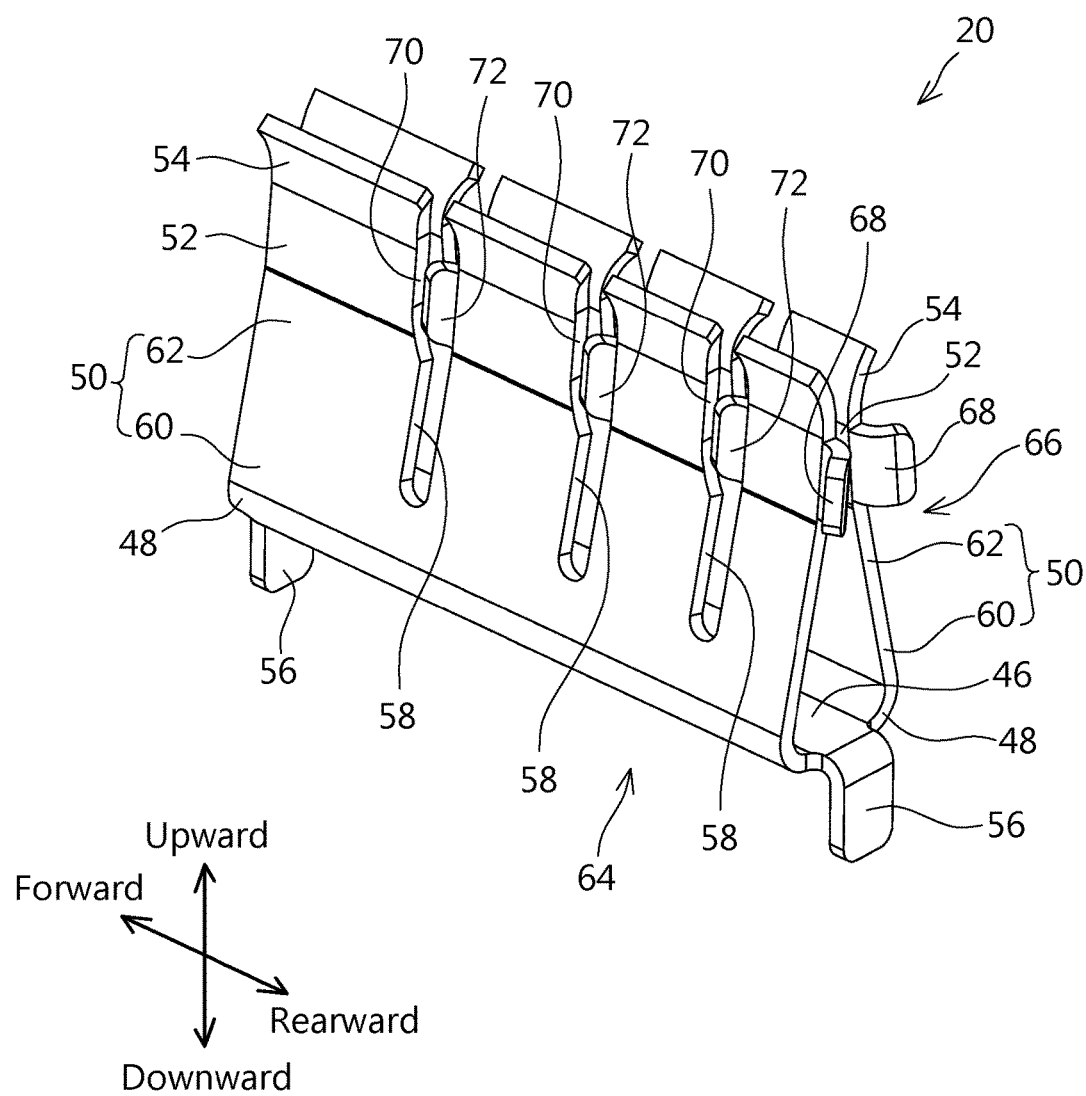
FIG. 13 is a perspective view of a positive discharging terminal 20 of another variant as seen from the rear upper side.
Figure 14:
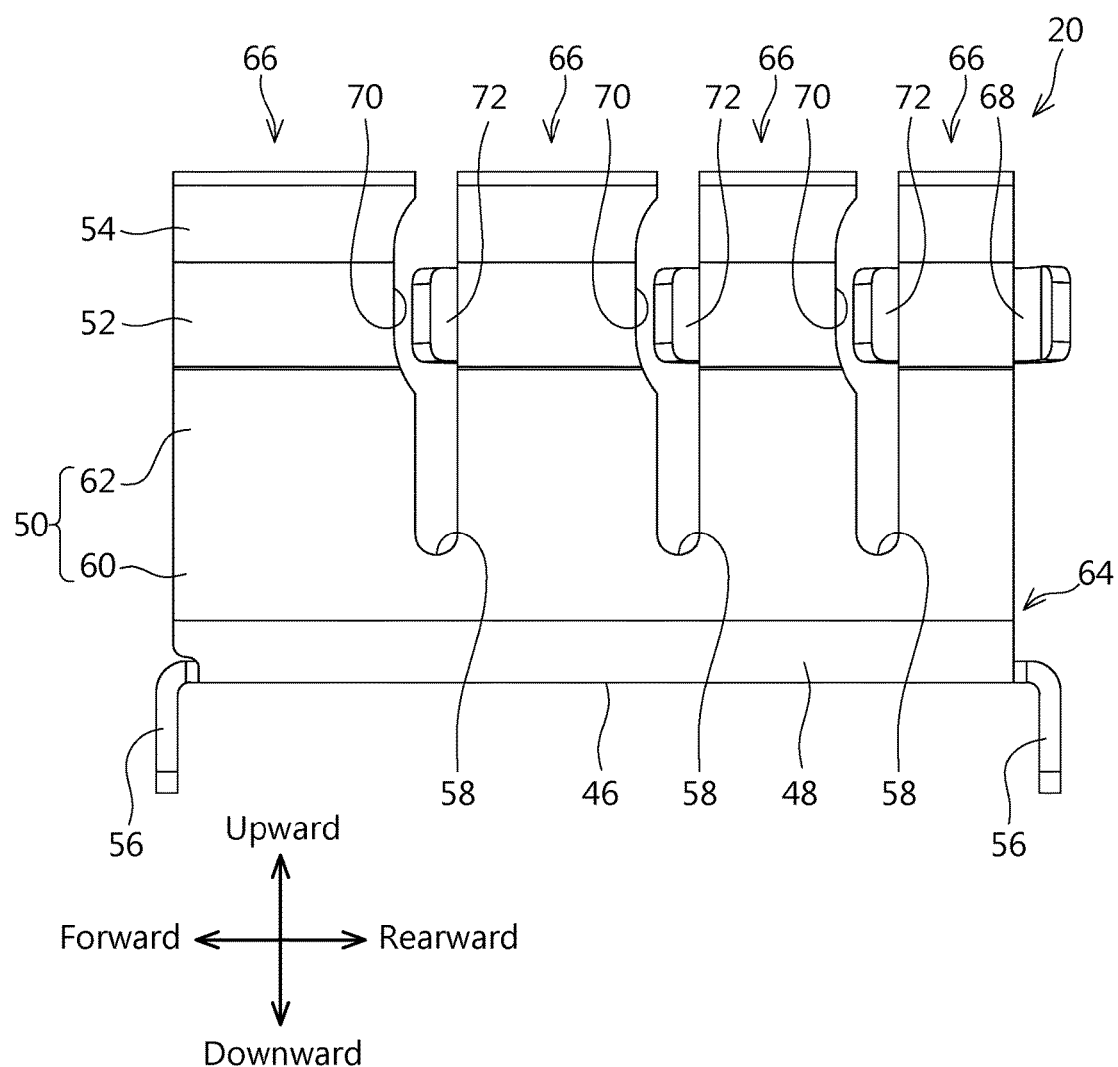
FIG. 14 is a side view of the positive discharging terminal 20 of the other variant.

Notably, in the above embodiment, a case in which all of the plurality of slits 58 of the positive discharging terminal 20 are provided at a same depth has been described, however, as shown for example in FIGS. 11 and 12, the respective slits 58 may be formed at different depths. In this case, the arm lengths of the pairs of elastic clamping pieces 66 can be made different for each of them while a height of the upper ends of the pairs of elastic clamping pieces 66 is set to a same height. Or, alternatively, as shown in FIGS. 13 and 14, the respective slits 58 may be formed at different intervals. In this case, widths of the pairs of elastic clamping pieces 66 in the front and rear direction may be set different from each other. In either of the cases, states such as a contact pressure of the pairs of elastic clamping pieces 66 can be varied.

Figure 15:
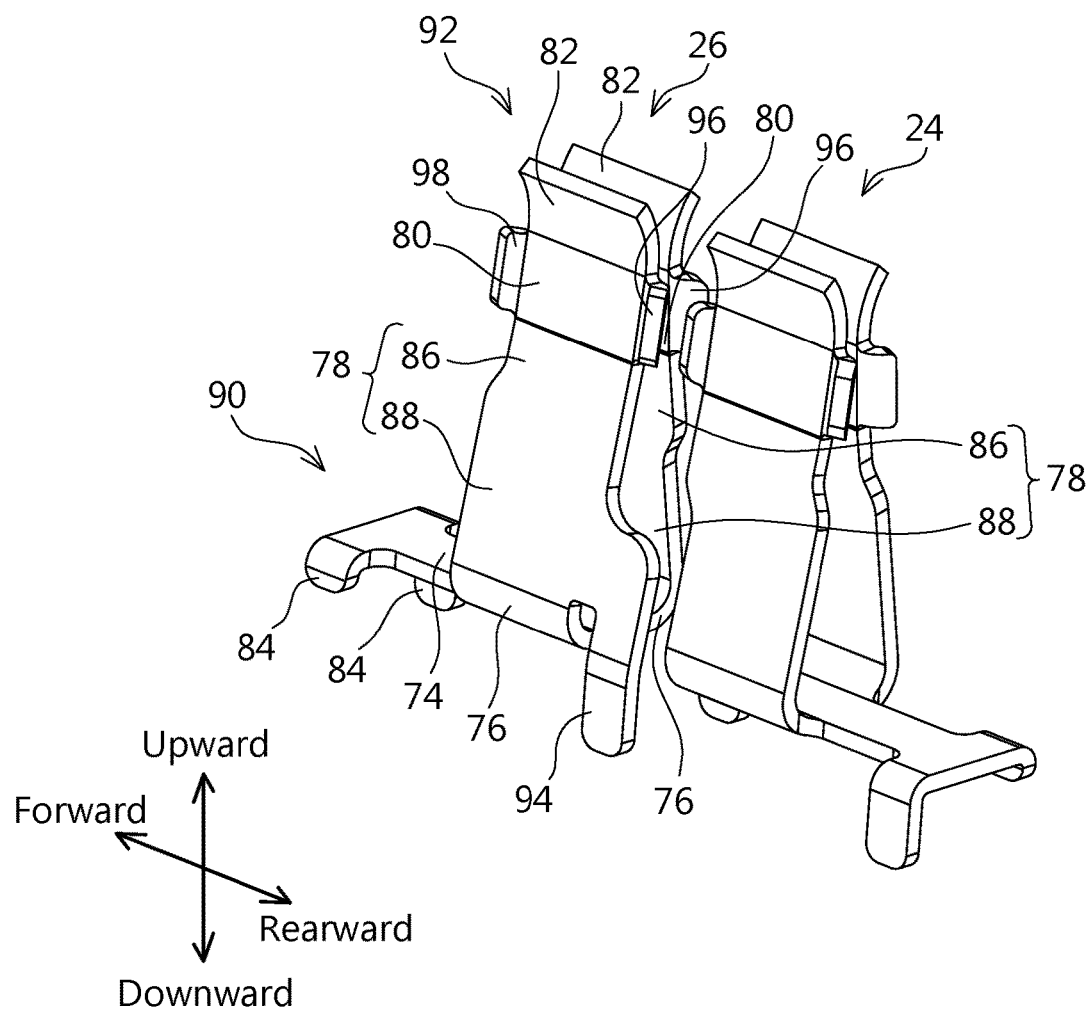
FIG. 15 is a perspective view of a discharge-prohibiting signal terminal 26 and a positive charging terminal 24 of an embodiment as seen from the rear upper side.
Figure 16:
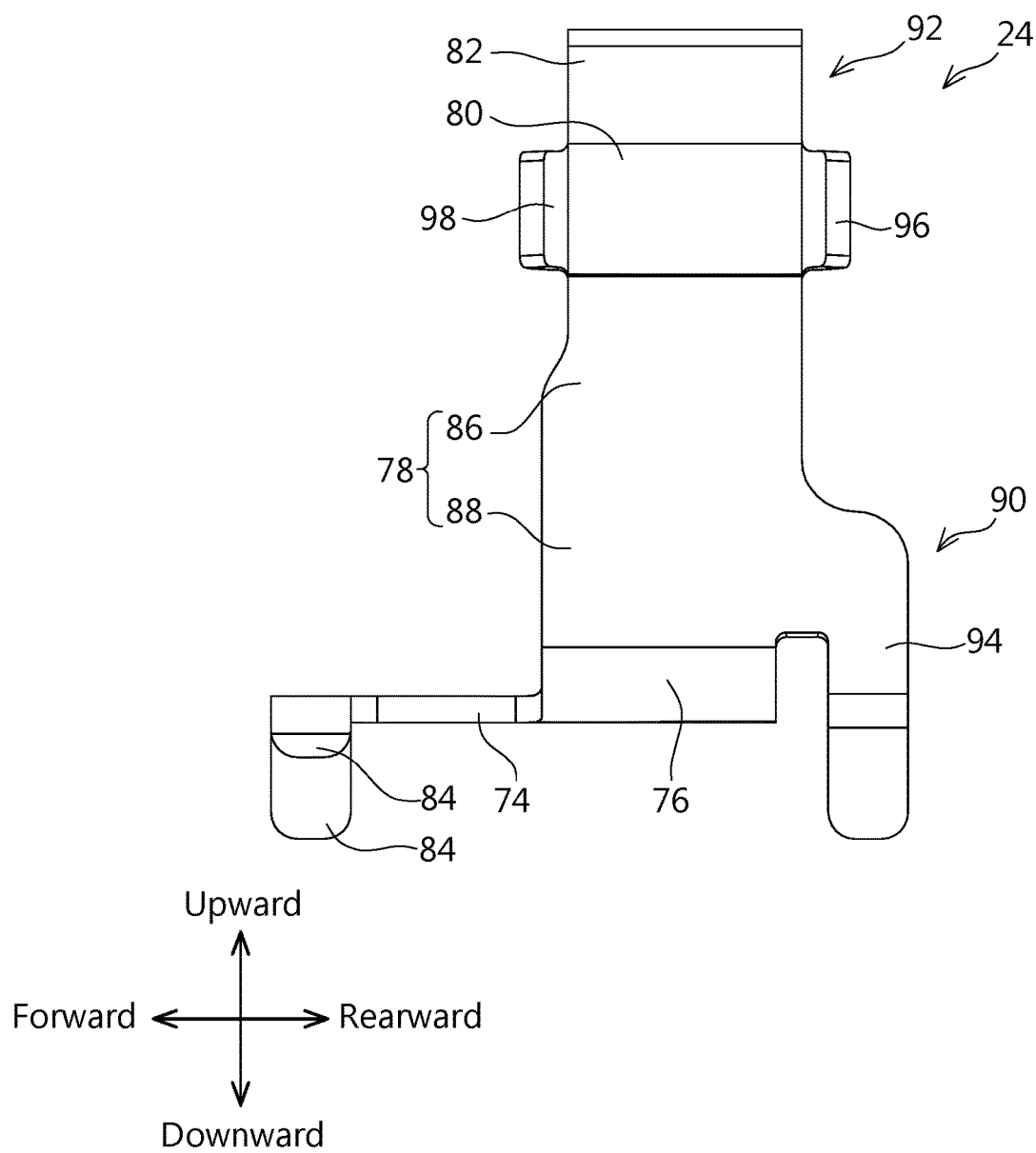
FIG. 16 is a side view of the discharge-prohibiting signal terminal 26 of the embodiment.
Figure 17:
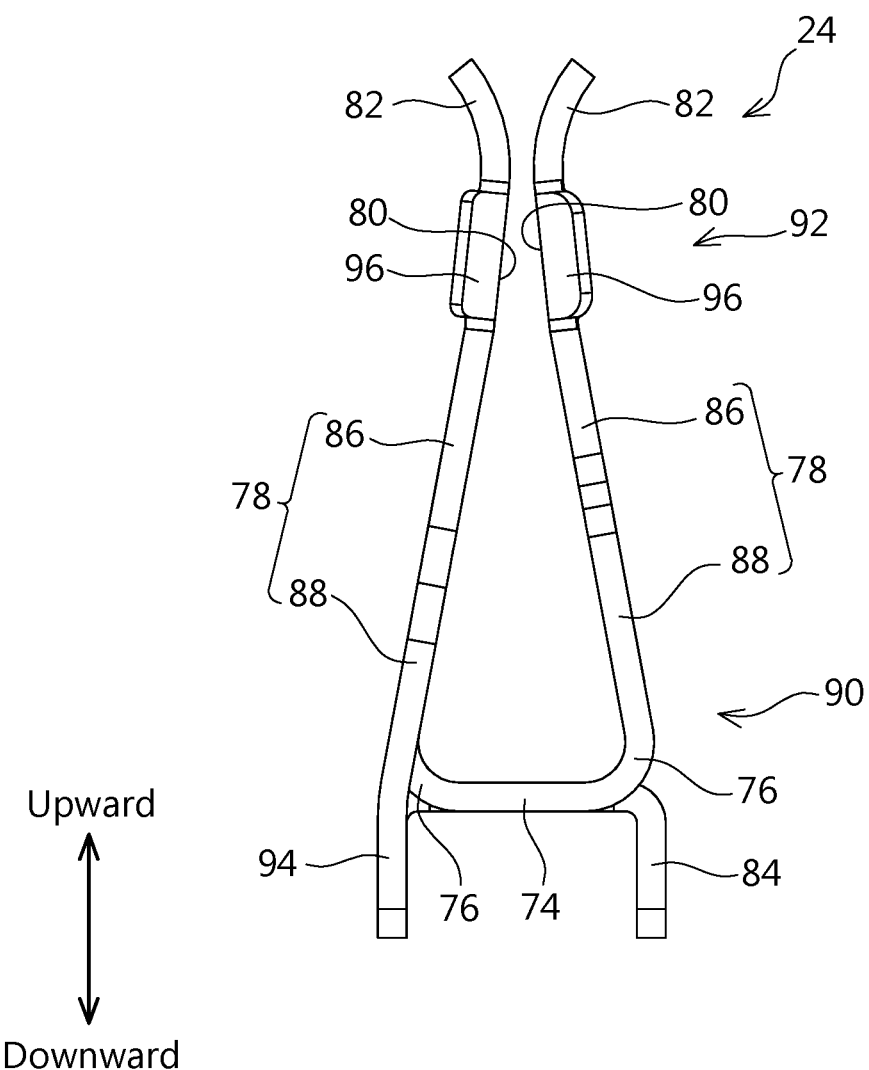
FIG. 17 is a rear view of the discharge-prohibiting signal terminal 26 of the embodiment.

The discharge-prohibiting signal terminal 26 shown in FIGS. 15 to 17 is produced by cutting and bending a metal plate. The discharge-prohibiting signal terminal 26 comprises a bottom plate portion 74, lower curved portions 76, inclined portions 78, clamping portions 80, and upper curved portions 82. The bottom plate portion 74 has a rectangular shape of which longitudinal direction extends along the front and rear direction of the battery pack 2. Fixing ribs 84 for fixing the discharge-prohibiting signal terminal 26 onto the controller board 16 (see FIG. 3) is provided at one of front and rear ends of the bottom plate portion 74. The fixing ribs 84 have a shape that is bent downward from the one of the front and rear ends of the bottom plate portion 74 on both side ends thereof in the left and right direction.

The lower curved portions 76 are provided on both sides of the bottom plate portion 74 in the left and right direction. The lower curved portions 76 have a shape that curves upward from both side ends of the bottom plate portion 74. The inclined portions 78 have a flat plate-like shape extending from upper ends of the lower curved portions 76. As shown in FIGS. 15 and 17, the inclined portions 78 are inclined relative to the bottom plate portion 74 so that an angle formed between each inclined portion 78 and the bottom plate portion 74 becomes an acute angle. The clamping portions 80 have a flat plate-like shape that extends from upper ends of the inclined portions 78 and are slightly bent outward. The clamping portions 80 have their inclination angle adjusted so that the inclination angle becomes an angle parallel to surfaces of the signal terminal 44 when the signal terminal 44 of the power tool 4 is engaged with the discharge-prohibiting signal terminal 26, that is, so that it becomes an angle that enables a surface contact with the signal terminal 44. The upper curved portions 82 have a shape that is curved outward from upper ends of the clamping portions 80.

Fixing ribs 94 for fixing the discharge-prohibiting signal terminal 26 onto the controller board 16 (see FIG. 3) is provided under the inclined portions 78. The fixing ribs 94 have a shape that extends downward from the inclined portions 78. Hereinbelow, the inclined portions 78 positioned above connection points of the fixing ribs 94 may be termed upper-side inclined portions 86, and other portions of the inclined portions 78 may be termed lower-side inclined portions 88. Further, the bottom plate portion 74, the lower curved portions 76, and the lower-side inclined portions 88 may collectively be termed a base 90 of the discharge-prohibiting signal terminal 26. Moreover, the upper-side inclined portions 86, the clamping portions 80, and the upper curved portions 82 may collectively be termed a pair of elastic clamping pieces 92 of the discharge-prohibiting signal terminal 26. That is, the discharge-prohibiting signal terminal 26 comprises the base 90, and the pair of elastic clamping pieces 92 that extends upward from the base 90.

Figure 18:
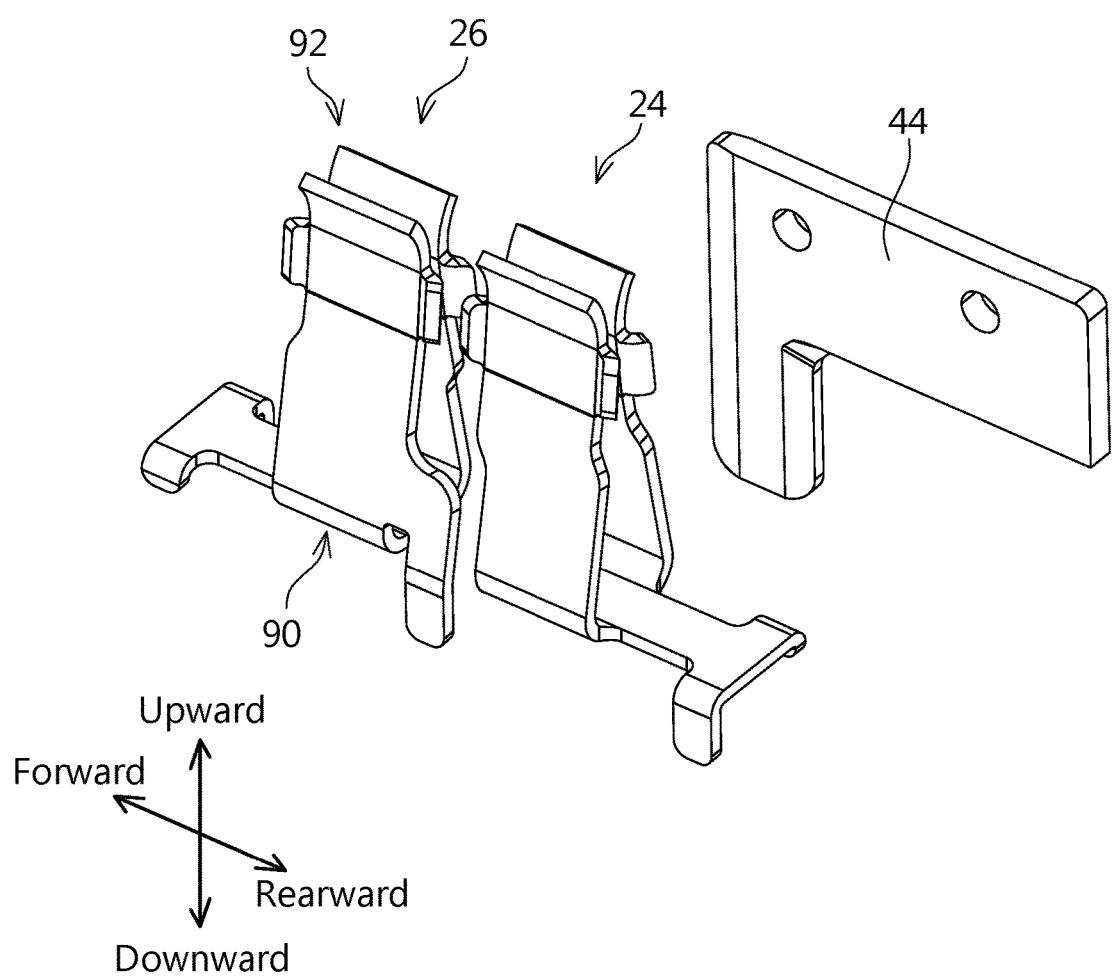
FIG. 18 is a perspective view of how a signal terminal. 44 is inserted into the discharge-prohibiting signal terminal 26 in the embodiment.
Figure 19:
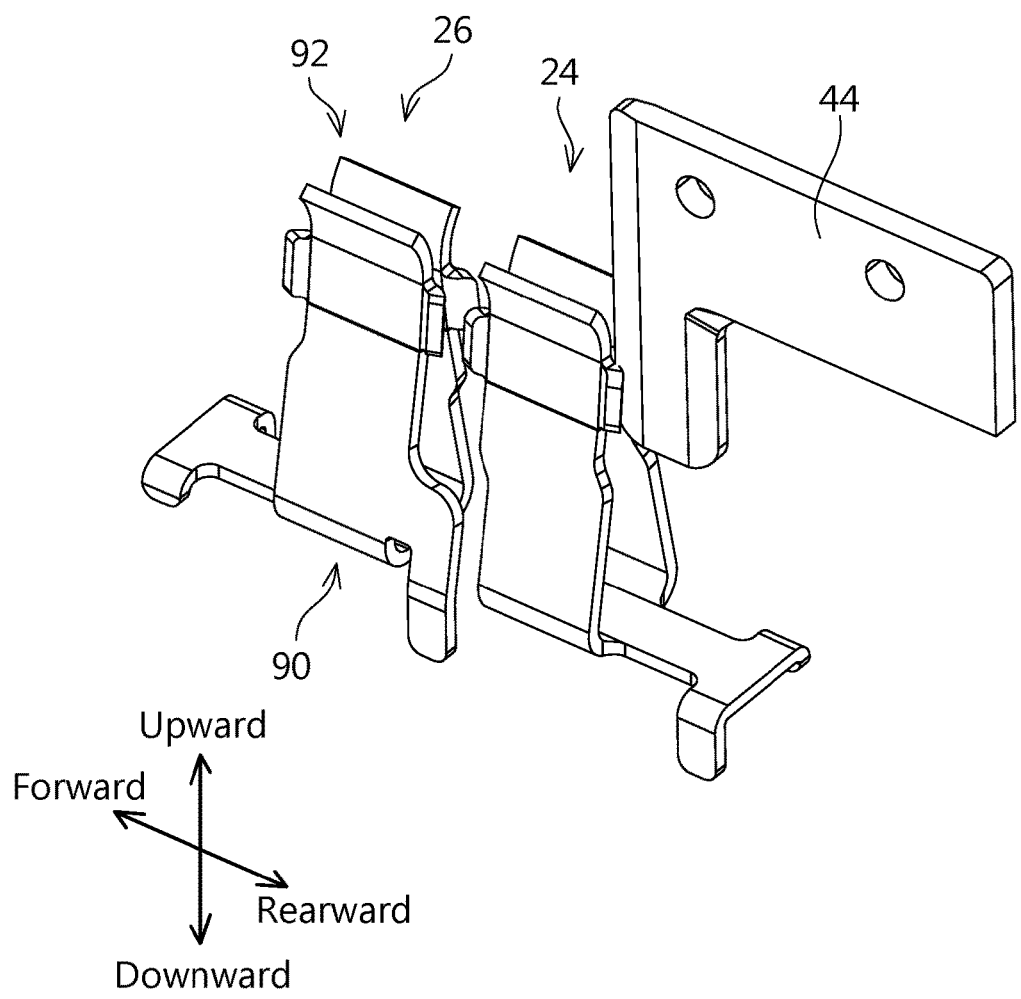
FIG. 19 is a perspective view of how the signal terminal 44 is inserted into the discharge-prohibiting signal terminal 26 in the embodiment.
Figure 20:
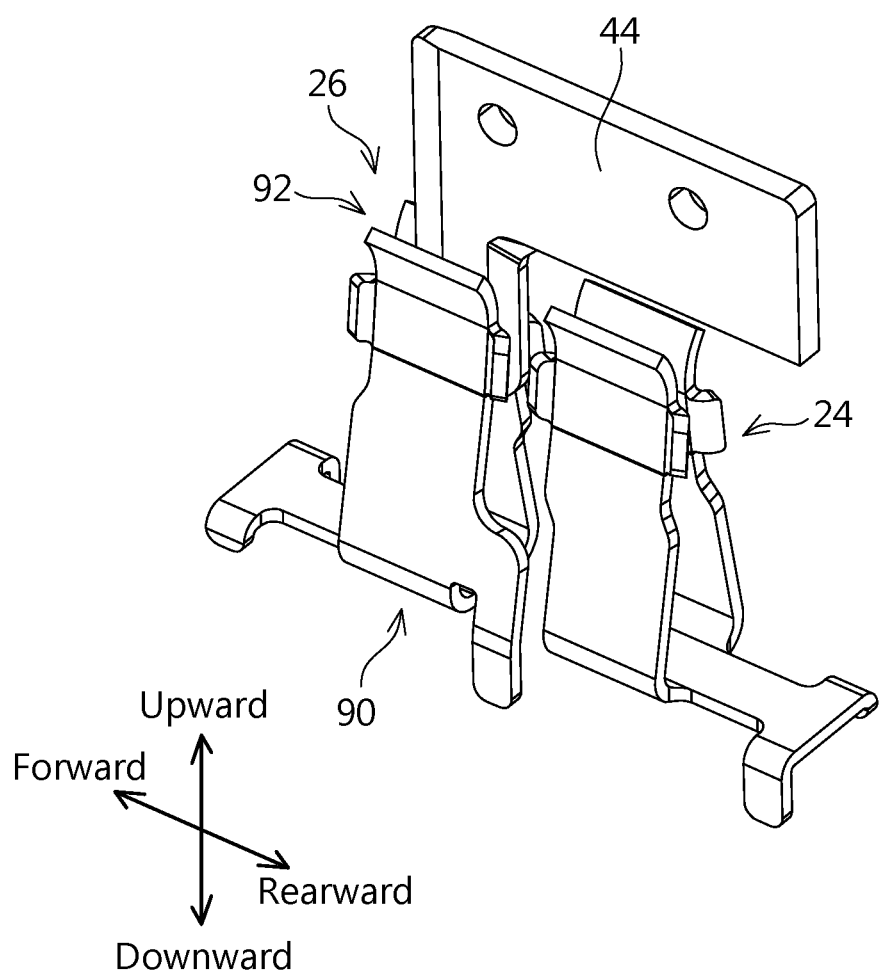
FIG. 20 is a perspective view of how the signal terminal 44 is inserted into the discharge-prohibiting signal terminal 26 in the embodiment.

As shown in FIGS. 18 to 20, in a case where the signal terminal 44 of the power tool 4 is to be inserted into the discharge-prohibiting signal terminal 26, a forward edge of the signal terminal 44 enters between the pair of elastic clamping pieces 92 of the discharge-prohibiting signal terminal 26, by which the pair of elastic clamping pieces 92 is opened outward, and the signal terminal 44 is clamped by the pair of elastic clamping pieces 92. At this occasion, the discharge-prohibiting signal terminal 26 and the signal terminal 44 are engaged by the clamping portions 80 of the discharge-prohibiting signal terminal 26 being pressed against the signal terminal 44 by resilient returning force of the pair of elastic clamping pieces 92. That is, the pair of elastic clamping pieces 92 receives the signal terminal 44 of the power tool 4 and clamps the signal terminal 44 from both sides when the battery pack 2 is attached to the power tool 4. Contrary to this, when the signal terminal 44 of the power tool 4 is taken out from the discharge-prohibiting signal terminal 26, the engagement of the discharge-prohibiting signal terminal 26 and the signal terminal 44 is released. Then, the pair of elastic clamping pieces 92 returns to its original shape by the resilient returning force of the pair of elastic clamping pieces 92.

As shown in FIGS. 15 to 17, in the discharge-prohibiting signal terminal 26 of the present embodiment, the inclined portions 78 are provided under the clamping portions 80, and the upper curved portions 82 are provided above the clamping portions 80. Due to this, upon when the signal terminal 44 engages with the discharge-prohibiting signal terminal 26, corners at the edges of the discharge-prohibiting signal terminal 26 in the up and down direction (that is, cut surfaces where the metal plate has been cut) do not make a point contact with surfaces of the signal terminal 44, and the clamping portions 80 and the surfaces of the signal terminal 44 can be brought into surface contact. By configuring as such, the signal terminal 44 can be inserted and taken out smoothly.

In the present embodiment, insertion guiding ribs 96 are provided at rearward ends of the pair of elastic clamping pieces 92 of the discharge-prohibiting signal terminal 26. The insertion guiding ribs 96 have a shape that extends rearward from the rearward ends of the clamping portions 80 and curves outward. When the insertion guiding ribs 96 are provided, the forward edge of the signal terminal 44 makes contact with inner surfaces of the insertion guiding ribs 96 upon when the signal terminal 44 is inserted, and the pair of elastic clamping pieces 92 is thereby spread outward. By configuring as above, the forward edge of the signal terminal 44 is allowed to enter easily in between the pair of elastic clamping pieces 92. Further, upon when the signal terminal 44 is inserted into the discharge-prohibiting signal terminal 26, the corners of the rearward edge of the discharge-prohibiting signal terminal 26 (that is, the cut surfaces where the metal plate has been cut) do not make a point contact with the surfaces of the signal terminal 44. Thus, by providing the insertion guiding ribs 96, the insertion of the signal terminal 44 can be performed smoothly.

In the present embodiment, withdrawal guiding ribs 98 are provided at forward ends of the pair of elastic clamping pieces 92 of the discharge-prohibiting signal terminal 26. The withdrawal guiding ribs 98 have a shape that extends forward from the forward ends of the clamping portions 80 and curves outward. When the withdrawal guiding ribs 98 are provided, upon when the signal terminal 44 is taken out from the discharge-prohibiting signal terminal 26, the corners of the forward edge of the discharge-prohibiting signal terminal 26 (that is, the cut surfaces where the metal plate has been cut) do not make a point contact with the surfaces of the signal terminal 44. Further, when the withdrawal guiding ribs 98 are provided, the signal terminal 44 can easily be taken out even in cases where a surface roughness caused by mechanical wear or electrical wear is generated on the surfaces of the signal terminal 44 of the power tool 4. Thus, by providing the withdrawal guiding ribs 98, the withdrawal of the signal terminal 44 can be performed smoothly.

In the present embodiment, the pair of elastic clamping pieces 92 of the discharge-prohibiting signal terminal 26 extends along the up and down direction. In this case, a contact area between the discharge-prohibiting signal terminal 26 and the signal terminal 44 can be made large by widening a width of the pair of elastic clamping pieces 92 in the front and rear direction. The contact area between the discharge-prohibiting signal terminal 26 and the signal terminal 44 can be made large without increasing the size of the battery pack 2. Further, in the configuration in which the pair of elastic clamping pieces 92 of the discharge-prohibiting signal terminal 26 extends along the up and down direction, an arm length of the pair of elastic clamping pieces 92 (that is, a length from a connecting point with the base 90 to the clamping portion 80) can be made sufficiently long. Due to this, clamping force by the pair of elastic clamping pieces 92 that is exerted upon when the discharge-prohibiting signal terminal 26 is engaged with the signal terminal 44 can be increased.

Notably, as shown in FIGS. 18 to 20, in the battery pack 2 of the present embodiment, upon when the signal terminal 44 is inserted into or taken out from the discharge-prohibiting signal terminal 26, the signal terminal 44 passes through the positive charging terminal 24 arranged on a rear side than the discharge-prohibiting signal terminal 26. In the battery pack 2 of the present embodiment, the positive charging terminal 24 and the discharge-prohibiting signal terminal 26 have a same shape; thus insertion guiding ribs 96 and withdrawal guiding ribs 98 which are identical to those of the discharge-prohibiting signal terminal 26 are provided respectively at forward and rearward ends of the positive charging terminal 24. Thus, upon when the signal terminal 44 is inserted into as well as it is taken out from the discharge-prohibiting signal terminal 26, the signal terminal 44 can smoothly pass through the positive charging terminal 24.

While specific examples of the present disclosure have been described above in detail, these examples are merely illustrative and place no limitation on the scope of the patent claims. The technology described in the patent claims also encompasses various changes and modifications to the specific examples described above.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A battery pack comprising:
   a battery terminal configured to engage an apparatus terminal having a flat plate-like shape so as to be electrically connected with the apparatus terminal, the battery terminal comprising:
   a base that includes a bottom plate portion, and
   a pair of elastic clamping pieces extending upward from the base and configured to receive the apparatus terminal when the battery pack is attached to an apparatus that includes the apparatus terminal and to clamp the apparatus terminal from both sides of the apparatus terminal,
   wherein:
   the battery pack is configured to be detachably attached to the apparatus by sliding the battery pack in a sliding direction along the apparatus terminal, wherein the sliding direction corresponds to a front-rear-direction of the battery pack, the pair of the elastic clamping pieces extends in a direction perpendicular to the sliding direction, and each of the elastic clamping pieces comprises a first inclined portion, wherein the first inclined portion is inclined relative to the bottom plate portion so that an angle formed between the first inclined portion and the bottom plate portion is an acute angle.

2. The battery pack according to claim 1, wherein each of the pair of elastic clamping pieces includes an insertion guide that is configured to facilitate insertion of the apparatus terminal in the pair of the elastic clamping pieces.

3. The battery pack according to claim 2, wherein each of the insertion guides is-includes an insertion guide rib extending forwardly and outwardly in the sliding direction.

4. The battery pack according to claim 2, wherein each of the insertion guides includes an insertion guide recess in each of the pair of the elastic clamping pieces.

5. The battery pack according to claim 1, wherein each of the pair of elastic clamping pieces includes a withdrawal guide that is configured to facilitate withdrawal of the apparatus terminal from the pair of the elastic clamping pieces.

6. The battery pack according to claim 5, wherein each of the withdrawal guides is-includes a withdrawal guide rib extending rearwardly and outwardly in the sliding direction.

7. The battery pack according to claim 1, wherein the battery terminal comprises a plurality of the pair of the elastic clamping pieces divided by one or more slits.

8. The battery pack according to claim 7, wherein each of the plurality of the pair of the elastic clamping pieces comprises front side ends and rear side ends along the sliding direction, the front side ends being located on a side for receiving the apparatus terminal along the sliding direction, and the rear side ends being located on an opposite side of the side for receiving the apparatus terminal along the sliding direction, the plurality of the pair of the elastic clamping pieces comprises:

at least one pair of elastic clamping pieces that comprises withdrawal guide ribs on the rear side ends;

an adjacent pair of elastic clamping pieces that comprises insertion guide recesses on the front side ends and that is adjacent to the rear side ends of the at least one pair of elastic clamping pieces; and a first pair of elastic clamping pieces that comprises insertion guide ribs on the front side ends and that is the first of the plurality of the pair of elastic clamping pieces to receive the apparatus terminal when the battery pack is attached to the apparatus, the withdrawal guide ribs extend from the rear side ends of the at least one pair of elastic clamping pieces, the insertion guide recesses are formed by notching the front side ends of the adjacent pair of the elastic clamping pieces, and the insertion guide ribs extend from the front side ends of the first pair of the elastic clamping pieces.

9. A battery pack comprising:

a battery terminal configured to engage an apparatus terminal having a flat plate-like shape so as to be electrically connected with the apparatus terminal, the battery terminal comprising a pair of elastic clamping pieces configured to receive the apparatus terminal when the battery pack is attached to an apparatus that includes the apparatus terminal and to clamp the apparatus terminal from both sides of the apparatus terminal, wherein:

the battery pack is configured to be detachably attached to the apparatus by sliding the battery pack in a sliding direction along the apparatus terminal, the pair of the elastic clamping pieces extends in a direction perpendicular to the sliding direction, an insertion guide is provided at each end of the pair of the elastic clamping pieces, the ends being provided on a side for receiving the apparatus terminal along the sliding direction, and each of the insertion guides is an insertion guide recess formed by notching the corresponding end of the pair of the elastic clamping pieces.

10. A battery pack comprising:

a battery terminal configured to engage an apparatus terminal having a flat plate-like shape so as to be electrically connected with the apparatus terminal, the battery terminal comprising a pair of elastic clamping pieces configured to receive the apparatus terminal when the battery pack is attached to an apparatus that includes the apparatus terminal and to clamp the apparatus terminal from both sides of the apparatus terminal, wherein:

the battery pack is configured to be detachably attached to the apparatus by sliding the battery pack in a sliding direction along the apparatus terminal, the pair of the elastic clamping pieces extends in a direction perpendicular to the sliding direction, and a withdrawal guide is provided at each end of the pair of the elastic clamping pieces, the ends being provided on an opposite side of a side for receiving the apparatus terminal along the sliding direction.

11. The battery pack according to claim 10, wherein each of the withdrawal guides is a withdrawal guide rib extending from the corresponding end of the elastic clamping pieces.

12. A battery pack comprising:

a battery terminal configured to engage an apparatus terminal having a flat plate-like shape so as to be electrically connected with the apparatus terminal, the battery terminal comprising a pair of elastic clamping pieces configured to receive the apparatus terminal when the battery pack is attached to an apparatus that includes the apparatus terminal and to clamp the apparatus terminal from both sides of the apparatus terminal, wherein:

the battery pack is configured to be detachably attached to the apparatus by sliding the battery pack in a sliding direction along the apparatus terminal, the pair of the elastic clamping pieces extends in a direction perpendicular to the sliding direction, the pair of the elastic clamping pieces comprises a plurality of pairs of the elastic clamping pieces divided by one or more slits, each of the plurality of pairs of the elastic clamping pieces comprises first-side ends and second-side ends along the sliding direction, the first-side ends being located on a side for receiving the apparatus terminal along the sliding direction, and the second-side ends being located on an opposite side of the side for receiving the apparatus terminal along the sliding direction, the plurality of pairs of the elastic clamping pieces comprises:

at least one pair of elastic clamping pieces that comprises withdrawal guide ribs on the second-side ends;

an adjacent pair of elastic clamping pieces that comprises insertion guide recesses on the first-side ends and that is adjacent to the second-side ends of the at least one pair of elastic clamping pieces; and a first pair of elastic clamping pieces that comprises insertion guide ribs on the first-side ends and that is the first pair to receive the apparatus terminal among the plurality of the pairs when the battery pack is attached to the apparatus, the withdrawal guide ribs extend from the second-side ends of the at least one pair of elastic clamping pieces, the insertion guide recesses are formed by notching the first-side ends of the adjacent pair of the elastic clamping pieces, and the insertion guide ribs extend from the first-side ends of the first pair of the elastic clamping pieces.

* * * * *